(12) United States Patent
Lal et al.

(10) Patent No.: US 12,694,878 B2
(45) Date of Patent: Jul. 28, 2026

(54) METHODS AND SYSTEMS FOR COMBINED VOICE AND GESTURE CONTROL

(71) Applicant: Adeia Guides Inc., San Jose, CA (US)

(72) Inventors: Dhananjay Lal, Englewood, CO (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 316 days.

(21) Appl. No.: 18/203,170

(22) Filed: May 30, 2023

(65) Prior Publication Data

US 2024/0404529 A1 Dec. 5, 2024

(51) Int. Cl.
| | |
|---|---|
| *G10L 17/22* | (2013.01) |
| *G06F 3/01* | (2006.01) |
| *G06V 40/16* | (2022.01) |
| *G06V 40/20* | (2022.01) |
| *G06V 40/70* | (2022.01) |
| *G10L 17/10* | (2013.01) |

(52) U.S. Cl.
CPC ............. *G10L 17/22* (2013.01); *G06F 3/017* (2013.01); *G06V 40/171* (2022.01); *G06V 40/20* (2022.01); *G06V 40/70* (2022.01); *G10L 17/10* (2013.01)

(58) Field of Classification Search
CPC ......... G10L 17/22; G10L 17/10; G10L 15/24; G10L 2015/223; G10L 2015/227; G10L 2015/228; G10L 15/22; G06F 3/017; G06V 40/171; G06V 40/20; G06V 40/70
See application file for complete search history.

(56) References Cited

U.S. PATENT DOCUMENTS

| | | | |
|---|---|---|---|
| 9,390,726 | B1 | 7/2016 | Smus et al. |
| 10,254,847 | B2 | 4/2019 | Kauffmann et al. |
| 10,890,653 | B2 | 1/2021 | Giusti et al. |
| 11,221,669 | B2 | 1/2022 | White et al. |
| 2014/0282273 | A1 | 9/2014 | Anderson |

(Continued)

FOREIGN PATENT DOCUMENTS

| | | | |
|---|---|---|---|
| EP | 3596585 | B1 | 1/2022 |
| KR | 10-2009-0084212 | A | 8/2009 |

(Continued)

OTHER PUBLICATIONS

Huo et al. "Scenariot: Spatially Mapping Smart Things Within Augmented Reality Scenes" CHI 2018, Apr. 21-26, 2018, Montreal, QC, Canada (Year: 2018).*

(Continued)

*Primary Examiner* — Pierre Louis Desir
*Assistant Examiner* — Keisha Y. Castillo-Torres
(74) *Attorney, Agent, or Firm* — HG LAW LLP

(57) ABSTRACT

Systems and methods are provided for enabling the combined voice and gesture control of a computing device. A voice command is received at a computing device from a user, and a gesture being performed by the user concurrently to the voice command being received is identified. A location of the user performing the gesture is identified in an area proximate to the user, and a direction vector extending from the user is identified based on the gesture. A target computing device in the area proximate to the user is identified from a plurality of computing devices based on the location of the user and direction vector, and the command is transmitted to the target computing device.

20 Claims, 11 Drawing Sheets

(56) References Cited

U.S. PATENT DOCUMENTS

| | | | |
|---|---|---|---|
| 2015/0185851 A1 | 7/2015 | Kauffmann et al. | |
| 2019/0237076 A1 | 8/2019 | Lovitt | |
| 2020/0118689 A1* | 4/2020 | Luthy | G16H 80/00 |
| 2020/0341546 A1 | 10/2020 | Yuan et al. | |
| 2022/0093101 A1* | 3/2022 | Krishnan | G06V 40/20 |

FOREIGN PATENT DOCUMENTS

| | | | |
|---|---|---|---|
| KR | 10-1688359 B1 | 12/2016 | |
| WO | 2012/070812 A3 | 7/2012 | |
| WO | WO-2024220086 A1 * | 10/2024 | G06F 3/0346 |

OTHER PUBLICATIONS

"3D Parametric Room Representation with RoomPlan", available online at: <https://machinelearning.apple.com/research/roomplan>, Oct. 4, 2022, 9 pages.

"Hands-On with Looking Glass 8K Holographic Display!", YouTube, available online at: <https://www.youtube.com/watch?v=mxhcPm6PwME>, Apr. 23, 2022, 723 pages.

Abou-Chakra, J., "Scene Understanding, Semantic SLAM, Implicit Representations", In Conference on Robot Learning, available online at: <https://nikosuenderhauf.github.io/projects/sceneunderstanding/>, retrieved on Nov. 27, 2024, 10 pages.

Alsawwwvaf, M., et al., "In Your Face: Person Identification Through Ratios and Distances Between Facial Features", Vietnam Journal of Computer Science, vol. 9, No. 2 2022, pp. 187-202.

Aull, A., et al., "Lexical stress determination and its application to large vocabulary speech recognition", ICASSP '85. IEEE International Conference on Acoustics, Speech, and Signal Processing, Apr. 1985.

Benítez-Guijarro, A., et al., "Coordination of Speech Recognition Devices in Intelligent Environments with Multiple Responsive Devices", Proceedings, vol. 31, No. 1, Nov. 20, 2019, 11 pages.

CSA, "The Foundation for Connected Things", available online at: <https://csa-iot.org/all-solutions/matter/>, retrieved on Nov. 27, 2024, 3 pages.

Developer, "RoomPlan Apple Developer Documentation", available online at: <https://developer.apple.com/documentation/roomplan>, retrieved on Nov. 27, 2024, 5 pages.

Droeschel, D., et al., "Learning to interpret pointing gestures with a time-of-flight camera", HRI '11: Proceedings of the 6th international conference on Human-robot interaction, Mar. 6, 2011, pp. 481-488.

Durrant-Whyte, H., et al., "Simultaneous localization and mapping: part I", IEEE Robotics & Automation Magazine, vol. 13, No. 2, Jun. 2006, 10 pages.

Hu, J., et al., "VGPN: Voice-Guided Pointing Robot Navigation for Humans", 2018 IEEE International Conference on Robotics and Biomimetics (ROBIO), Dec. 2018, 7 pages.

Intel (Registered), "Intel RealSense(Trademark) Technology", available online at: <https://www.intel.com/content/www/us/en/architecture-and-technology/realsense-overview.html>, retrieved on Nov. 27, 2024, 4 pages.

Lee, S. J., et al., "Speech Activity Detection with Lip Movement Image Signals", 2007 IEEE Pacific Rim Conference on Communications, Computers and Signal Processing, Aug. 2007.

Lexalytics, "Machine Learning (ML) for Natural Language Processing (NLP)", available online at: <https://www.lexalytics.com/blog/machine-learning-natural-language-processing/>, retrieved on Nov. 27, 2024, 15 pages.

Lim, H., "Introduction to SLAM (Simultaneous Localization and Mapping)", available online at: <https://ouster.com/insights/blog/introduction-to-slam-simultaneous-localization-and-mapping?cacheBuster=1732710990243>, Aug. 31, 2022, 7 pages.

Okta, "What is OAuth 2.0?", available online at: <https://auth0.com/intro-to-iam/what-is-oauth-2>, retrieved on Nov. 27, 2024, 7 pages.

Perzanowski, D., et al., "Integrating natural language and gesture in a robotics domain", Proceedings of the 1998 IEEE International Symposium on Intelligent Control (ISIC) held jointly with IEEE International Symposium on Computational Intelligence in Robotics and Automation (CIRA) Intell, 1998, 8 pages.

Schwartz , E. H., "Amazon Adds Alexa Gesture Controls and Text-to-Speech to Echo Smart Displays", Synthedia, available online at: <https://voicebot.ai/2022/12/13/amazon-adds-alexa-gesture-controls-and-text-to-speech-to-echo-smart-displays/>, Dec. 13, 2022, 3 pages.

Sensics, "Positional tracking: "Outside-in" vs. Inside-out", available online at: <https://medium.com/insights-on-virtual-reality/positional-tracking-outside-in-vs-inside-out-2e867780be57>, Aug. 4, 2014, 11 pages.

The Lead, "Eight measurements of the body can identify anyone on earth", available online at: <https://theleadsouthaustralia.com.au/industries/defence/eight-measurements-of-the-body-can-identify-anyone-on-earth/>, Dec. 4, 2014, 5 pages.

Turn on voice recognition with Voice Match, available online at: <https://support.google.com/assistant/answer/9071681?hl=en&co=GENIE.Platform%3DAndroid>, retrieved on Nov. 27, 2024, 2 pages.

UltraLeap, "How Hand Tracking Works", available online at: <https://www.ultraleap.com/company/news/blog/how-hand-tracking-works/>, Sep. 3, 2020, 5 pages.

UltraLeap, "Make in-store stand out", available online at: <https://www.ultraleap.com/enterprise/touchless-experiences/immersive-retail/>, retrieved on Nov. 27, 2024, 11 pages.

Velazco, C., et al., "Meet this year's most intriguing CES attendees: Robots", available online at: <https://www.washingtonpost.com/photography/interactive/2023/ces-2023-robots/>, Jan. 7, 2023, 1 page.

Wolf, M., et al., "Channel selection measures for multi-microphone speech recognition", Speech Communication, vol. 57, Feb. 2014, pp. 170-180.

Yang, E., "Startup Piccolo uses gestures to enable home automation", Smart Building & Home, available online at: <https://www.asmag.com/showpost/26497.aspx>, Mar. 2, 2018, 3 pages.

Yida, "What is a Time of Flight Sensor and How does a ToF Sensor work?", available online at: <https://www.seeedstudio.com/blog/2020/01/08/what-is-a-time-of-flight-sensor-and-how-does-a-tof-sensor-work/>, retrieved on Nov. 27, 2024, 9 pages.

* cited by examiner

700

702

Determine the user issuing voice command using their voice profile

704

Retrieve user image from a database

708

Determine the user issuing voice command using lip movement detection

706

Match the user image to an image captured in real time from a camera

710

Identify user in the captured images / video

712

Determine gesture and gesture parameters of the identified user

1000

1002

Receive Voice Command from User

1003

Filter Target Device Candidates

1004

Identify Gesture Being Performed by User

1006

Identify Location of User Performing Gesture

1008

Identify Direction Vector

1010

Identify Target Computing Device

1012

Transmit Command to Target Computing Device

METHODS AND SYSTEMS FOR COMBINED VOICE AND GESTURE CONTROL

One or more disclosed embodiments are directed towards systems and methods for enabling improved voice and gesture control of a computing device. In particular, systems and methods are provided herein that enable improved combined voice and gesture control of a computing device, where a direction vector is identified based on the user gesture, and a command is transmitted to a target computing device based on the direction vector. Some embodiments or aspects relate to additional or alternative features, functionalities, and/or fields.

SUMMARY

With the proliferation of internet-connected smart devices, such as smart speakers, smart lights, smart refrigerators, smart blinds and smart televisions, controlling one or more smart devices via a single smart device, such as a smart speaker, has become increasingly convenient and popular. Voice activation has enabled users to easily query smart devices for information (e.g., "Alexa, what is the temperature of my home?" or "Alexa, is my front door open?") or to actuate smart devices themselves (e.g., "Alexa, set downstairs thermostat to 69 degrees" or "Alexa, turn on foyer light"). A user interface that is generated for display on a tablet device, or a smartphone, may quickly become unwieldy when used in conjunction with a plurality of smart devices. Such a user interface may comprise long lists of devices with similar names, or the user interface may struggle to fit all of the smart devices in a virtual room. The use of voice activation avoids the need for an unwieldy user interface, and it enables far fewer interactions, for example, to control a smart device than with user interface elements on an application running on a smart phone. Furthermore, voice activation is a relatively natural way of interacting with a smart device, and the machine learning models used in natural language processing (NLP) can extract intent from coherent or even semi-coherent speech. However, even with voice activation, a smart system comprising many devices may be prone to errors. For example, if the system comprises a plurality of devices with similar names, the system may mistake one similar-sounding device for another. Some users may also have a poor recall of different device names. For example, a smart system comprising a plurality of smart lights may name, or label, the smart lights "tree light" and "three light" which need to be used when issuing a command to a smart light, such as "Alexa, turn on tree light." In order to improve systems comprising multiple smart devices, there is a need to enable a user interface that provides a straightforward way to interact with a system comprising similar, or the same, smart devices in a single location, such as a living room.

To overcome these problems, systems and methods are provided herein that enable improved voice and gesture control of a computing device.

Systems and methods are described herein that enable improved voice and gesture control of a computing device. In accordance with some aspects of the disclosure, a method is provided. The method includes receiving a voice command from a user at a computing device, and identifying a gesture being performed by the user concurrently with receiving the voice command. A location of the user performing the gesture in an area proximate to the user is identified, and a direction vector extending from the user is identified based on the gesture. A target computing device in the area proximate to the user is identified from a plurality of computing devices based on the location of the user and direction vector, and the command is transmitted to the target computing device.

In an example system, a system provides user interface for turning on a smart light in a room that has a plurality of smart lights. The user utters a command to a smart speaker, for example, "Alexa, turn on that lamp," while pointing with their finger to a smart light in a room. The smart speaker receives the command via a microphone and determines, via an integrated camera, a gesture being performed by the user and a location of the user in the room. A direction vector extending from the user's finger is identified, and a target computing device in the area proximate to the user is identified based on the location of the user and the direction vector. For example, a smart light is identified to minimize the angle subtended between the device location and the direction vector. On identifying the smart light, a command to "turn on" is transmitted to the identified smart light. In this manner, a user interface that provides a straightforward way to interact with a system comprising similar, or the same, smart devices in a single location is provided.

A computing device may determine a plurality of candidate computing devices, based on the received voice command and the gesture. Identifying the target computing device from the plurality of computing devices may further comprise identifying the target computing device from the plurality of candidate computing devices. A spatial map indicating locations of each of the plurality of candidate computing devices may be received or accessed, and identifying the location of the user performing the gesture may further comprise identifying the location of the user on the spatial map relative to at least a subset of the locations of each of the plurality of candidate computing devices. The candidate computing devices may be members of a group. An additional candidate computing device may be added to the group, and in response to the additional candidate computing device being added to the group, a request to update the spatial map may be generated. A location of the additional candidate computing device may be received, and the spatial map may be updated with the location of the additional candidate computing device. A computing device may comprise a voice assistant service, i.e., one or more modules that perform NLP to determine user intent, and generate and/or transmit actions to target computing devices, such as smart devices. The generating and/or transmitting of the actions may be performed either directly by the computing device comprising the voice assistance service or via an intermediary such as a hub.

A plurality of users local to the computing device may be identified based on a captured image, and the user from whom the voice command was received may be identified via image processing. Identifying the gesture may further comprise identifying the gesture being performed by the identified user from whom the voice command was received. A user associated with the voice command may be identified via speech recognition and a user profile. An image associated with the user may be accessed via the user profile. Identifying the user from whom the voice command was received may further comprise identifying the user via image processing based on the accessed image associated with the user. In this manner, the system may effectively identify a user who is issuing a command, when there are a plurality of users in a location. As many of the plurality of users may be moving in a manner that could be interpreted as performing a gesture, identifying the user who is issuing the command enables a gesture to be identified with the user issuing the command.

A plurality of users local to the computing device may be identified based on a captured video, and lip movements of the plurality of users may be identified via video processing. The user from whom the voice command was received may be identified based on the lip movements of the plurality of users, and identifying the gesture may further comprise identifying the gesture being performed by the identified user from whom the voice command was received.

The gesture may be a first gesture, and a capture of a plurality of users local to the computing devices may be received from a capture device. The user from whom the voice command was received may be identified based on the capture. A plurality of commands may be transmitted to the capture device, wherein the plurality of commands may comprise commands to move the capture device to keep the user from which the command was received in the received capture. A query may be output, and a response to the query comprising a second gesture being performed by the user may be identified via the capture. Moving the capture device may comprise any suitable movement that enables the capture device to keep a user in a field of view of the capture device, including, for example, rotating, tilting and/pr panning the capture device.

A group of computing devices associated with the computing device that receives the voice command may be identified, and a type of computing device may be identified based on the command. A user profile may be accessed to identify a command history. Identifying the plurality of candidate computing devices may further comprise filtering the initial plurality of identified candidate computing devices based on at least one of the group of computing devices associated with the computing device that receives the voice command, the identified type of computing device, the computing devices capable of performing the command, and/or the identified command history.

Identifying the direction vector extending from the user may further comprise identifying the direction vector based on at least one of a direction of a user's finger, a direction of a user's hand, a direction of a user's head movement and/or a direction of a user's gaze.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 9:
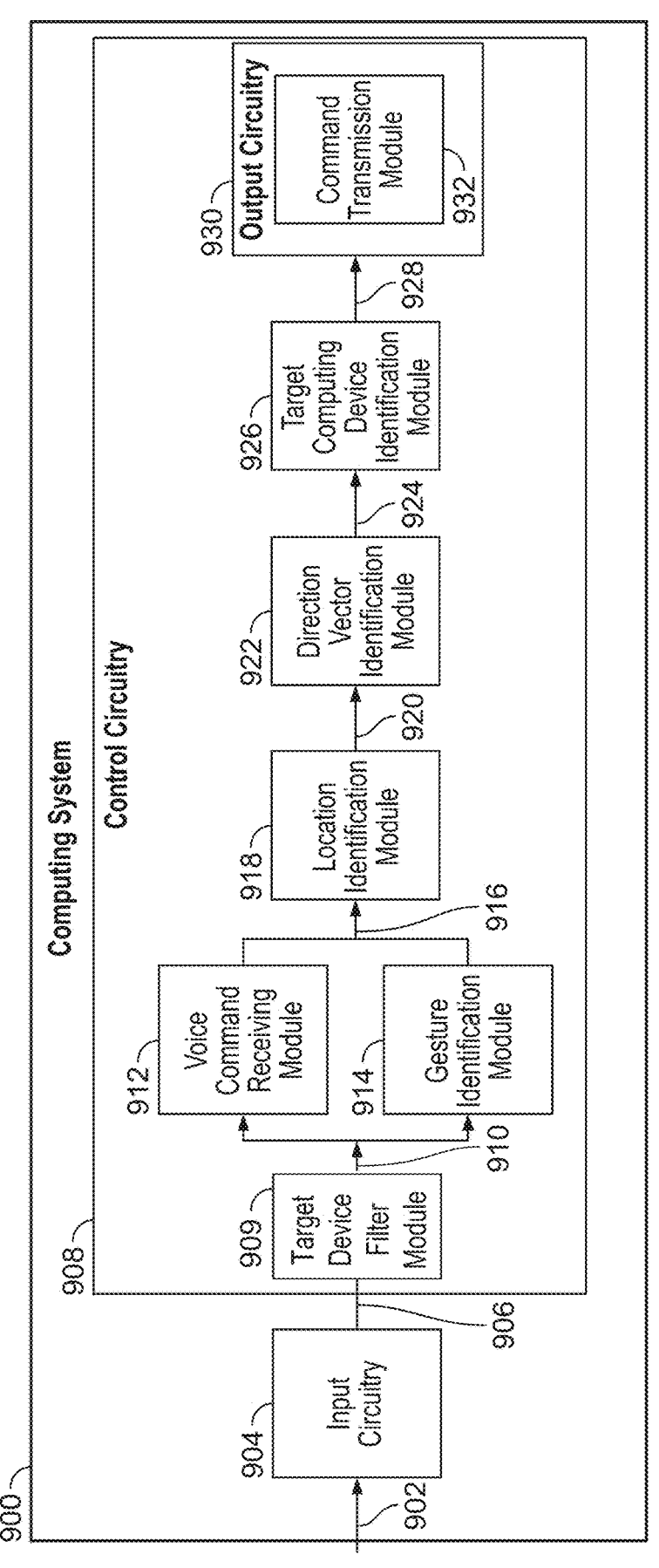
Figure 10:
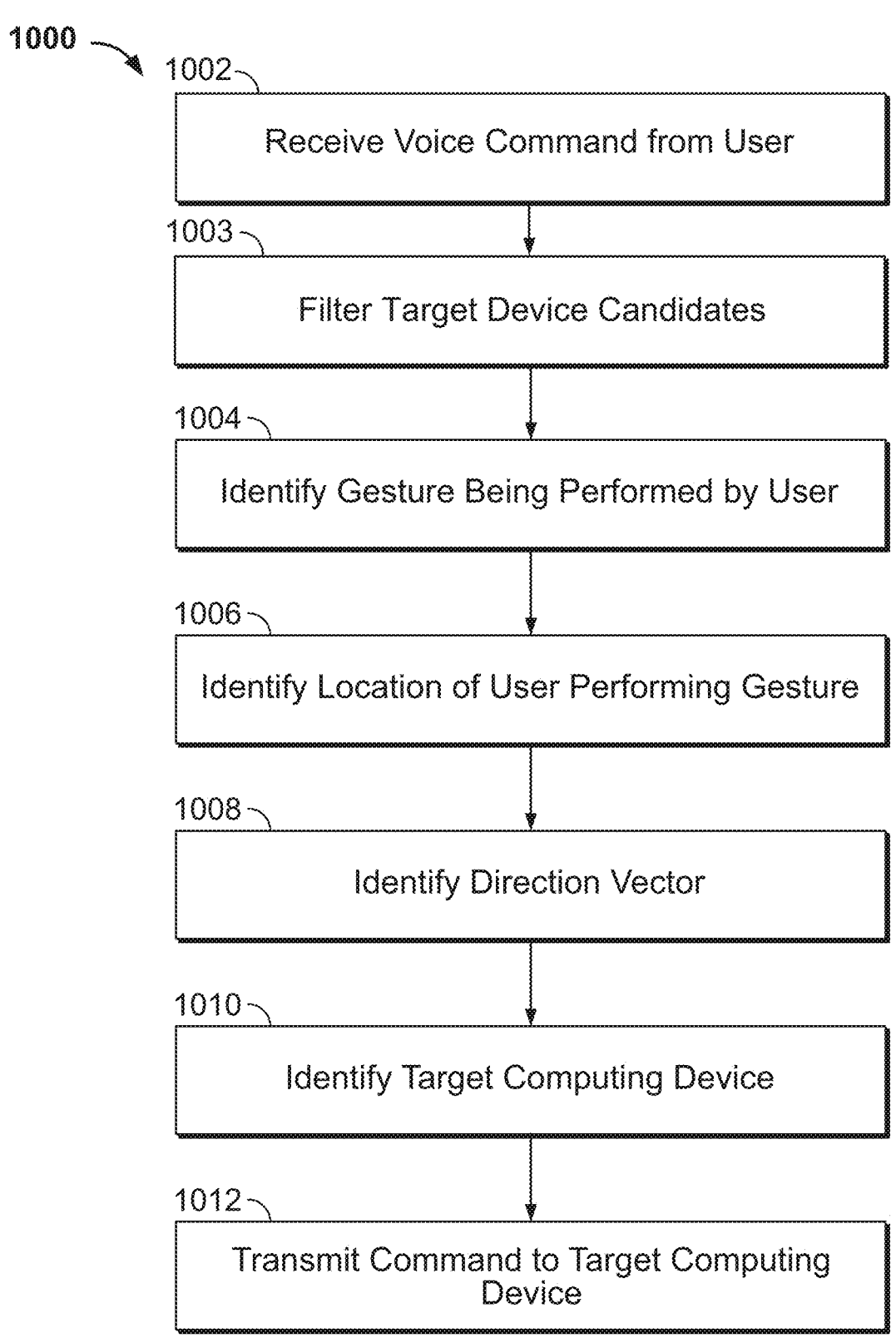

FIG. 9 shows a block diagram representing components of a computing system, and dataflow therebetween for enabling improved voice and gesture control of a computing device, in accordance with some embodiments of the disclosure; and FIG. 10 shows another flowchart of illustrative steps involved in enabling improved voice and gesture control of a computing device, in accordance with some embodiments of the disclosure.

DETAILED DESCRIPTION

A gesture is any indication of a device indicated by a user, for example, it includes a user pointing at a device with one or more limbs. A limb includes, for example, a finger, a hand, an arm, an elbow, a toe, a foot, a leg and/or a knee. In another example, a gesture may comprise a user indicating a device via a head inclination and/or movement. In a further example, a gesture may comprise a user looking, or gazing, at a device with one or both eyes. A gesture may comprise any combination of limb, head and/or eye indication. In some examples, a gesture may comprise a user indicating (i.e., by pointing, gazing and/or any other way of indicating described herein) a device for longer than a threshold amount of time, for example, longer than 0.5 seconds, 1 second and/or 5 seconds.

A command is any instruction to control a smart device and/or system. It may comprise an instruction, for example, to turn a smart device on or off. In another example, it may comprise an instruction to alter an operation performed by a smart device, for example, for a smart refrigerator, or smart heating system, to turn up, or down, the temperature. In some examples, a command may be a conditional command, for example, to keep a smart vacuum cleaner away from a pet and/or to turn off the lights when no one is in a room. A conditional command may enable commands to have a future element to them. For example, a conditional command may comprise the command "Turn that on when I am gone." A conditional command enables a first part of a system, such as a voice assistant service, to "queue" a query, or to generate an application programming interface (API) request with conditions to a second part of the system, such as the home automation system. In another example, a command could be to "Turn on the dishwasher when I leave the home," for example. In some examples, a smart device may track one or more users in order to determine when to actuate a received command. In a further example, the smart device that is receiving the command may determine whether the command relates to another smart device in the room.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality headset, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
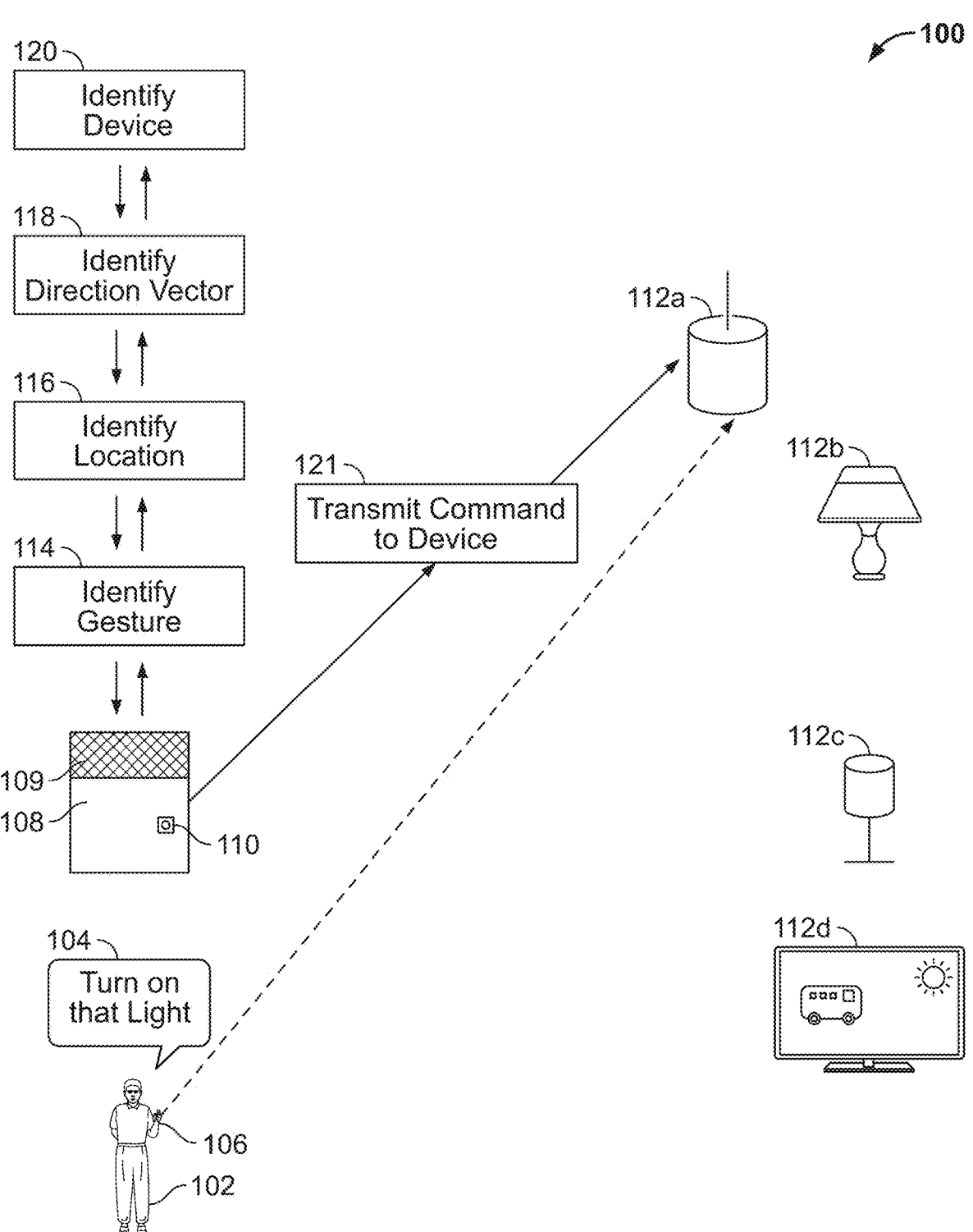
FIG. 1 shows an example environment for enabling improved voice and gesture control of a computing device, in accordance with some embodiments of the disclosure.

FIG. 1 shows an example environment for enabling improved voice and gesture control of a computing device, in accordance with some embodiments of the disclosure. The environment 100 comprises a user 102, a computing device that is configured to receive a command, and a plurality of target computing devices, one or more of which are configured to perform an action based on a command received at the computing device. In this example, the computing device is a smart speaker 108, and the target computing devices are smart devices including smart lights 112a, 112b, 112c and a smart television 112d. The user utters a voice command 104; in this example, the voice command is "Turn on that light." The user also concurrently makes a gesture towards a smart device 112a, 112b, 112c, 112d. In this example, the gesture is the user pointing 106 towards a smart light 112a. The smart speaker 108 receives the voice command via, for example, an integrated microphone 109 and detects the gesture via, for example, a capture device, such as a camera 110. At 114, the gesture 106 made by the user 102 is identified, and at 116, a location of the user performing the gesture in an area proximate to the user is identified. At 118, a direction vector extending from the user is identified based on the gesture. For example, if the smart speaker 108 determines that the user 102 is making a gesture towards a smart device 112a, 112b, 112c, 112d, the direction vector may be a direction vector that extends from the user's finger. At 120, a target smart device 112a is identified in the area proximate to the user from the plurality of smart devices 112a, 112b, 112c, 112d based on the location of the user and the direction vector. For example, a smart device is identified to minimize the angle subtended between the device location and the direction vector. On identifying the target smart device 112a, at 121, a command is transmitted to the target smart device 112a. Any of steps 114, 116, 118, 120, 121 and/or 122 may be performed at the smart speaker and/or transmitted via a network, such as the internet, to a server, where the identifying and/or transmitting may be performed. A result of any of the identifying steps 114, 116, 118, 120 may be transmitted back to the smart speaker 108, where the rest of the steps may be performed. Any mix of steps may be performed at the smart speaker 108 and/or a server. In this way the ease of user interaction with systems comprising multiple smart devices is improved. A user can interact with a system comprising multiple smart devices via voice and gesture and, as such, a user does not need to recall multiple names for similar, or the same, smart devices in a single location, such as a living room. In this manner, a user interface that provides a straightforward way to interact with a system comprising similar, or the same, smart devices in a single location, such as a living room, is provided.

Broadly, the environment depicted in FIG. 1 shows how a system can process a user gesture to provide user the interface capability of gesturing and voice control together to command a sensing and control system component for performing an action and/or for furnishing specific information. The system may be a home automation system, a home appliance with multiple sensors and/or actuators or even an automobile system. For example, a user may say, "Alexa, close that vent," while pointing to an air vent in a car in order control the climate control in a car. "Alexa" may be substituted for any suitable wake-word for initiating a smart assistant. Other applications such as infotainment or body functions in a vehicle may also be controlled via a similar system.

Figure 2:
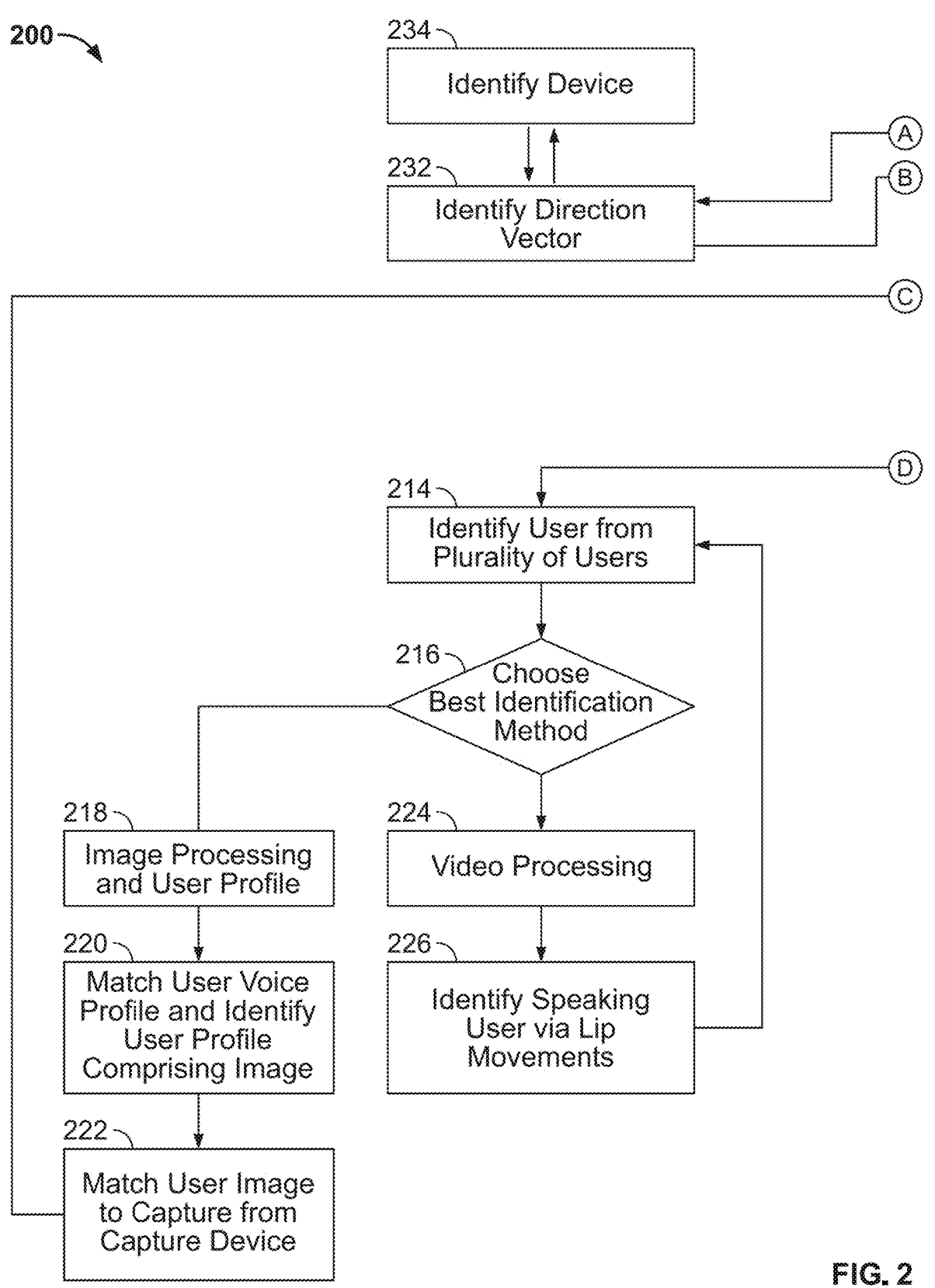
FIG. 2 shows another example environment for enabling improved voice and gesture control of a computing device, in accordance with some embodiments of the disclosure.
Figure 2:
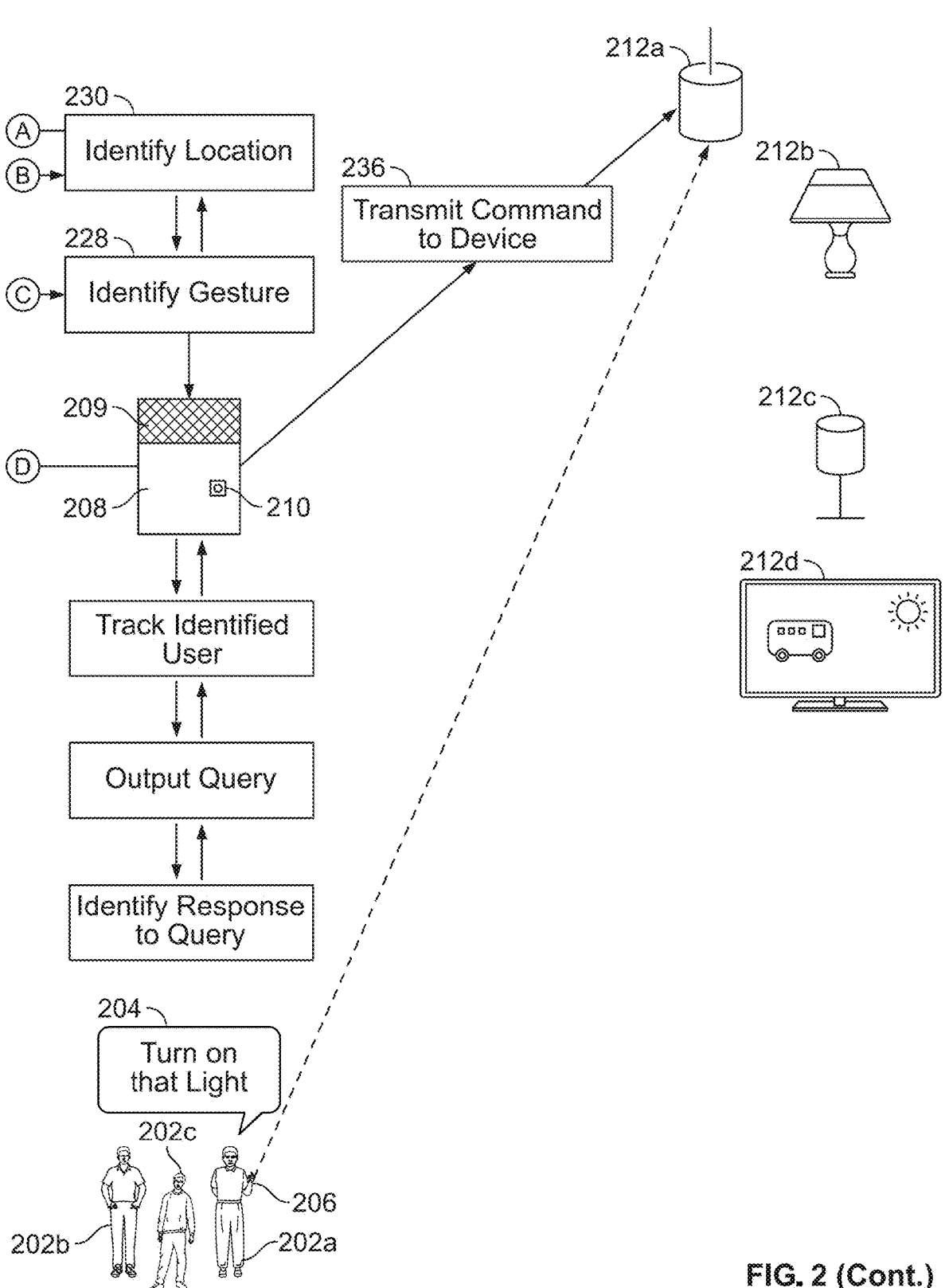

FIG. 2 shows another example environment for enabling improved voice and gesture control of a computing device, in accordance with some embodiments of the disclosure. The environment 200 comprises a plurality of users 202a, 202b, 202c, a computing device that is configured to receive a command, and a plurality of target computing devices, one or more of which are configured to perform an action based on a command received at the computing device. In this example, the computing device is a smart speaker 208, and the target computing devices are smart devices including smart lights 212a, 212b, 212c and a smart television 212d. The user utters a voice command 204, in this example, the voice command is "Turn on that light." The user also concurrently makes a gesture towards a smart device 212a, 212b, 212c, 212d. In this example, the gesture is the user pointing 206 towards a smart light 212a. The smart speaker 208 receives the voice command via, for example, an integrated microphone 209 and detects the gesture via, for example, a capture device, such as a camera 210.

At 214, identification of a user 202a from the plurality of users 202a, 202b, 202c is initiated, and at 216, the best identification method is chosen from image processing or video processing. If image processing is chosen, the process proceeds to step 218, where image processing is used to identify a user 202a from the plurality of users 202a, 202b, 202c. At 220, a speaking user 202a is identified via image processing and a user profile. At 220, on receiving a voice command, the user's voice may be matched to a voice profile associated with a user. The voice profile may be stored in a user profile, which may also comprise an image of the user. At 222, image recognition may be used to match the person in a capture of the users 202a, 202b, 202c from the camera 210 of the smart speaker, and a speaking user's face may be identified by matching an image of the users 202*a*, 202*b*, 202*c* with the image associated with the user profile. On identifying the user, the process proceeds to step 228.

If video processing is chosen, the process proceeds to step 224, where video processing is used to identify a user 202*a* who is speaking, and at 226, the speaking user 202*a* is identified via video processing to identify lip movements. On identifying the user, the process proceeds to step 228. In some examples, the camera 210 may be moved (i.e., zoomed, panned, tilted and/or rotated) to follow the identified user 202*a*. In this manner, the smart speaker 208 may lock on to a user. Locking onto a user in this manner may minimize the amount of computing processing to receive and act on a query, in particular, if the initial query results in follow-on queries. This may also be useful in examples where there are multiple users 202*a-c* in the same vicinity, and it may enable the command to be processed more efficiently.

At 228, the gesture 206 made by the speaking user 202*a* is identified, and at 230, a location of the speaking user 202*a* performing the gesture in an area proximate to the speaking user 202*a* is identified. At 232, a direction vector extending from the user 202*a* is identified based on the gesture, for example, if the smart speaker 208 determines that the user 202*a* is making a gesture towards a smart device, 212*a*, 212*b*, 212*c*, 212*d*, the direction vector may be a direction vector that extends from the user's finger. At 234, a target smart device 212*a* is identified in the area proximate to the user 202*a* from the plurality of smart devices 212*a*, 212*b*, 212*c*, 212*d* based on the location of the user and the direction vector. For example, a smart device is identified to minimize the angle subtended between the smart device location and the direction vector. On identifying the target smart device 212*a*, at 236, a command is transmitted to the target smart device 212*a*. Any of steps 214, 216, 218, 220, 222, 224, 226, 228, 230, 232, 234, 236 may be performed at the smart speaker and/or transmitted via a network, such as the internet, to a server, where the identifying and/or transmitting may be performed. A result of any of the interim steps may be transmitted back to the smart speaker 208, where the rest of the steps may be performed. Any mix of steps may be performed at the smart speaker 208 and/or a server.

Figure 3:
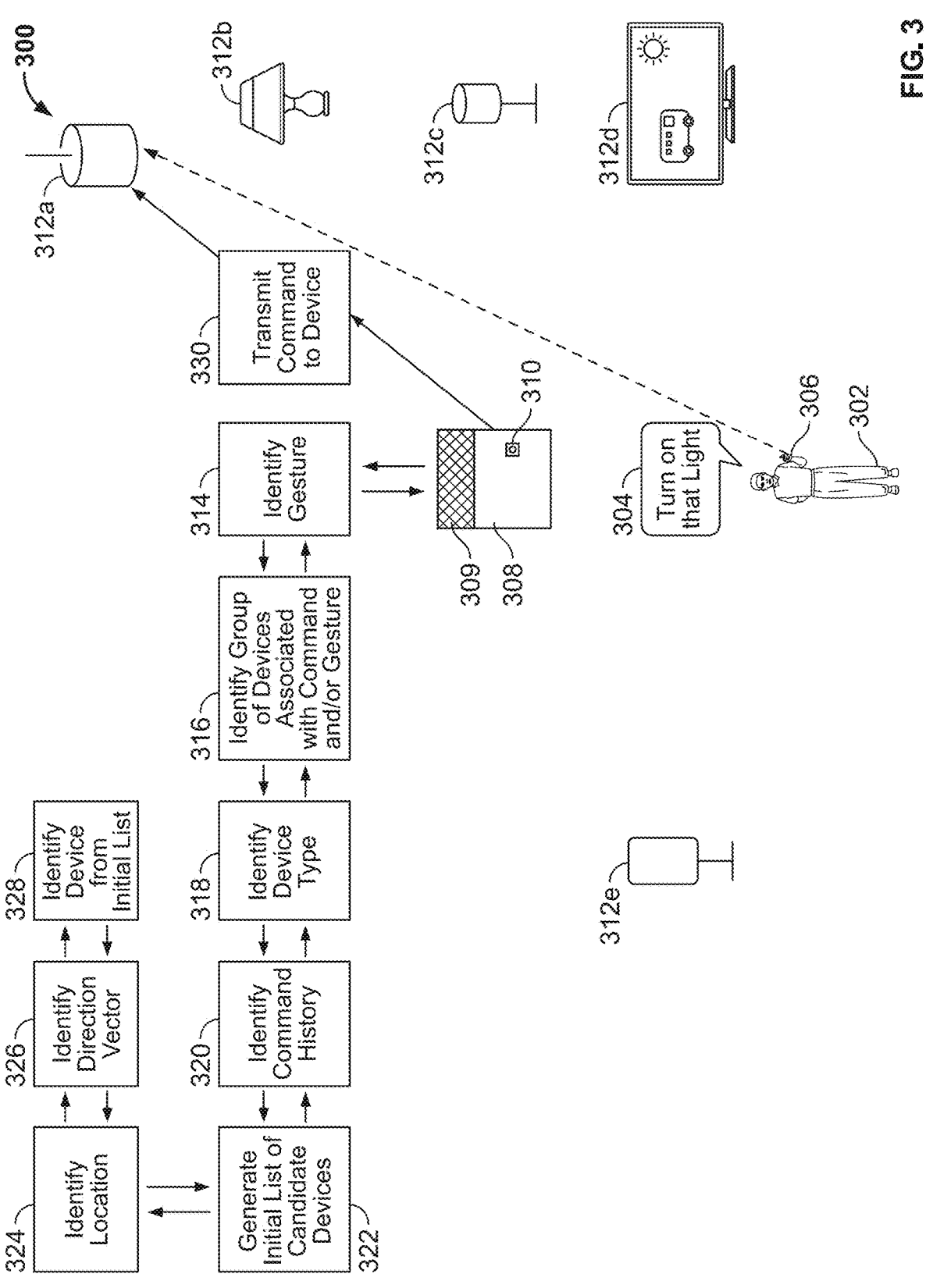
FIG. 3 shows another example environment for enabling improved voice and gesture control of a computing device, in accordance with some embodiments of the disclosure.

FIG. 3 shows another example environment for enabling improved voice and gesture control of a computing device, in accordance with some embodiments of the disclosure. The environment 300 comprises a user 302, a computing device and a plurality of target computing devices. In this example, the computing device is a smart speaker 308, and the target computing devices are smart devices including smart lights 312*a*, 312*b*, 312*c*, 312*e* and a smart television 312*d*. The user utters a voice command 304, in this example, the voice command is "Turn on that light." The user also concurrently makes a gesture towards a smart device 312*a*, 312*b*, 312*c*, 312*d*. In this example, the gesture is the user pointing 306 towards a smart light 312*a*. The smart speaker 308 receives the voice command via, for example, an integrated microphone 309 and detects the gesture via, for example, a capture device, such as a camera 310.

At 314, the gesture 306 made by the user 302 is identified, and at 316, a group of devices associated with the command and/or gesture is identified. For example, only those devices in the general proximity of the direction pointed to by the user may be identified. In this example, the group may include devices 312*a*, 312*b*, 312*c* and 312*d*, as they are in the general direction pointed to by the user. Device 312*e* is not in the general direction pointed to by the user, so, in this example, it is not included in the group. At 318, a device type is identified. In this example, devices 312*a*, 312*b*, 312*c* are of the type "smart light" and device 312*d* is of the type "smart television." For example, as the user is asking for a light to be turned on, only those devices that comprise a light for lighting a room may be identified in the group. In this example, the group comprises smart lights 312*a*, 312*b*, 313*c*. Each target computing device 312*a-e* may be modeled with attributes, for example, "light," and input and/or output interfaces. For example, a smart light may be modeled with input attributes such as "on," "off," "dim 5%." A dimming attribute may have, for example, any percentage between 1 and 99 associated with it. In a similar manner, the smart light may be modeled with output attributes such as positive and/or negative responses to a command to turn the smart light on, off or to dim it. An identified match between a target device 312*a-e* model and the interpreted user command may put the target device on the candidate device list. At 320, a command history is identified. For example, it may be identified that the user regularly turns on smart lights 312*a* and 312*c* via voice command, but not smart light 312*b*. In this example, the initial list of candidate devices may be generated at 322 to include smart lights 312*a* and 312*c*. At 324 a location of the user performing the gesture in an area proximate to the user is identified. At 326, a direction vector extending from the user is identified based on the gesture. At 328, a target smart device 312*a* is identified in the area proximate to the user from the plurality of smart devices in the initial list of candidate devices, based on the location of the user and the direction vector. For example, a smart device is identified to minimize the angle subtended between the smart device location and the direction vector. On identifying the target smart device 312*a*, at 330, a command is transmitted to the target smart device 312*a*. Any of steps 314, 316, 318, 320, 322, 324, 326, 328, 330 may be performed at the smart speaker and/or transmitted via a network, such as the internet, to a server, where the step, or steps, may be performed. A result of any of the steps 314, 316, 318, 320, 322, 324, 326, 328, 330 performed at a server may be transmitted back to the smart speaker 308, where the rest of the steps may be performed. Any mix of steps may be performed at the smart speaker 308 and/or a server.

Figure 4:
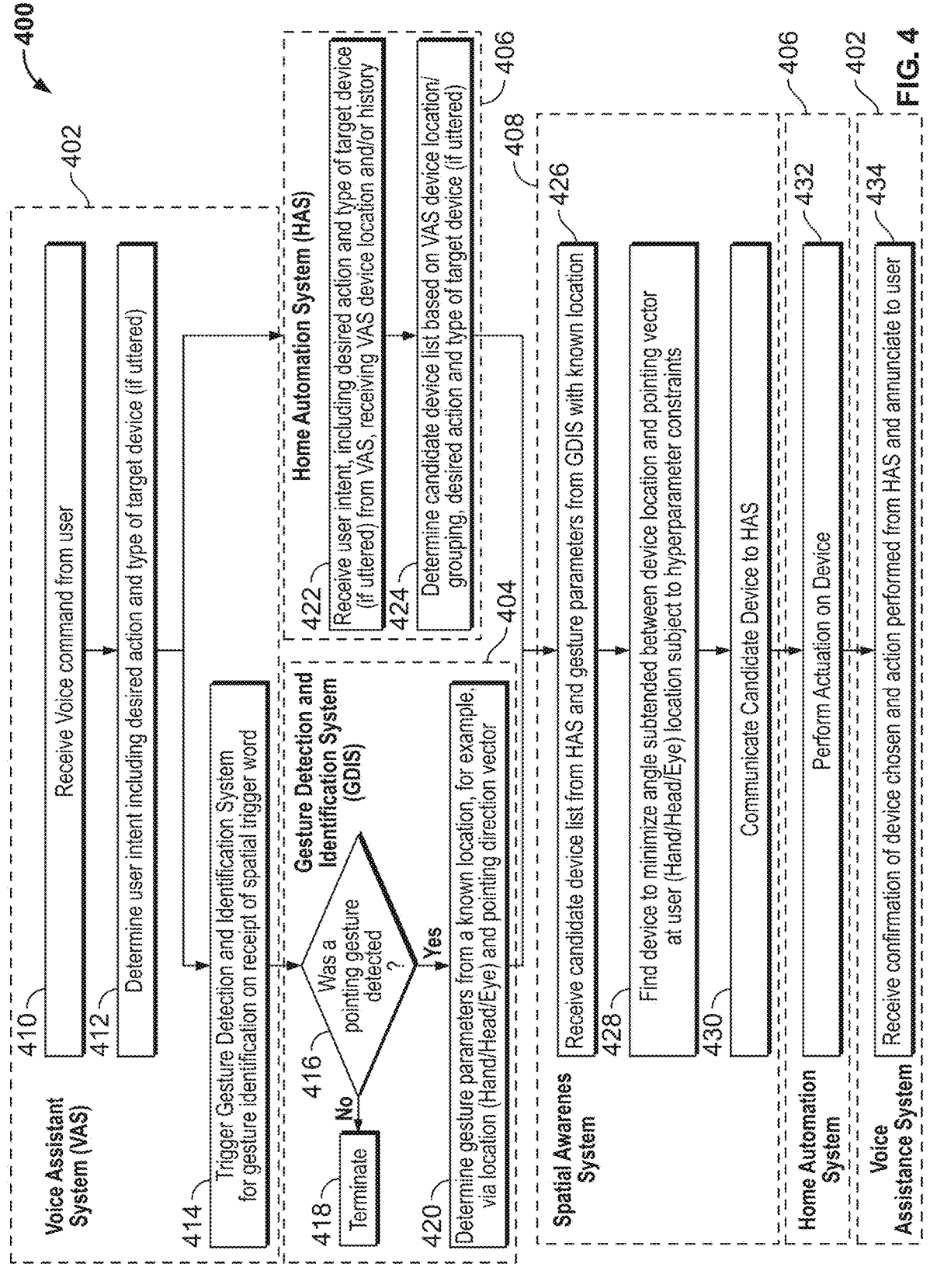
FIG. 4 shows a flowchart of illustrative steps involved in enabling improved voice and gesture control of a computing device, in accordance with some embodiments of the disclosure.

FIG. 4 shows a flowchart of illustrative steps involved in enabling improved voice and gesture control of a computing device, in accordance with some embodiments of the disclosure. Process 400 may be implemented, in whole or in part, on any of the aforementioned computing devices (e.g., computing devices 108, 208, 308; e.g., by way of executing one or more instructions or routines stored in the memory or storage of a device). In addition, one or more actions of the process 400 may be incorporated into or combined with one or more actions of any other process or embodiments described herein.

The flowchart broadly describes the interactions between a voice assistance system (VAS) 402, a gesture detection and identification system (GDIS) 404, a home automation system (HAS) 406 and a spatial awareness system (SAS) 408.

An HAS may comprise a plurality of components, such as smart computing devices. The HAS may read sensor data from a plurality of the components comprising sensors and may perform actuation on a plurality of the components. All of the components may be described by their behavior, for example, via data fields that each component furnishes and by actions that can be performed by each component. The HAS may have an interface with a voice assistant system, such as that implemented by a smart speaker, and the voice assistant system may issue a command and receive a response. Although the HAS is a "home" automation system, the HAS can also be any other appliance system in or out of a home, and/or a car subsystem.

A VAS may comprise a plurality of voice assistant devices, each of which may be capable of receiving a voice command from a user. As a whole, the system may employ NLP techniques to determine user intent, and thereafter it may issue a command to an HAS to perform an action on a specific component, or it may furnish data elements back to the user. The interface with the HAS may be local to the home (or any other location, including a car), or it may be via a remote server, such as via the cloud. In some examples, the HAS may be combined with, or subsume a VAS via any known smart home automation standard, such as Matter.

A GDIS may be used to determine user gestures. The system may identify a plurality of gesture types, as well as parameters related to the gesture. For example, the GDIS may identify a pointing gesture (i.e., a gesture of type: pointing), and may determine two parameters to accompany the pointing gesture, for example, user location (or pointing hand and/or finger location) and pointing direction. The GDIS may have an interface with the VAS, so that the VAS may temporally correlate a pointing action with an utterance of a voice command.

The SAS may enable spatial awareness. The SAS may maintain a map, and/or any other spatial data, of a home, or any other space (including a car), in which the locations of different automation and voice assistant devices are indicated. The SAS may take input from a GDIS and use the aforementioned map and/or spatial data to determine a candidate list of devices to which a user may be pointing.

The VAS 402 receives a voice command from a user at 410, and, at 412, determines, for example, a user intent including a desired action and a type of target device (if included in the voice command). For example, a voice command may simply comprise "Turn that on," in which case only a desired action could be determined. If a voice command comprises "Turn down the temperature of the fridge," a device type could be determined in addition to the desired action. At 414, the GDIS is triggered for gesture identification on the receipt of a spatial trigger word.

When a user commands the voice assistant system to perform an action, together with a gesture that points to a device, the VAS may determine the intent of the user. The intent is typically an action and a target device on which the action is to be performed. In this example, the target device may not be mentioned explicitly, but instead a spatial trigger word is mentioned. A spatial trigger word may be a demonstrative pronoun such as "this," "that," "these," and/or "those" The spatial trigger word may also, or alternatively, be "it." The demonstrative pronoun may indicate that a gesture was made pointing to a device, or set of devices, as determined by NLP at the VAS. After making this determination, the VAS may perform two actions concurrently, or in quick succession: the VAS may trigger the GDIS to perform gesture detection, and the VAS may send the name of the VAS device that received the user command and information about the specific command to the HAS. The information sent to the HAS may include intent, an action to be performed, and/or the device type, if uttered by the user in the command. For example, a user may issue a command "Turn that on," in which case a device type was not uttered. In another example, a user may issue a command, "Turn that light off," in which case a device type of light was uttered. A device type may be determined from a similar word, for example, the word lamp may be mapped to a device type of light.

The process proceeds from step 414 to the GDIS 404, where it is determined, at 416, whether a pointing gesture was detected. If a pointing gesture is not detected then, at 418, the process is terminated. If a pointing gesture is detected then, at 420, gesture parameters are determined from a known location (e.g., hand, head and/or eye) and a pointing direction gesture is determined.

A message may be passed from the VAS to the GDIS when a demonstrative pronoun is identified by the natural language processor. The GDIS may immediately perform gesture identification, so that it occurs fast enough such that a user's pointing action is perfectly natural. For example, a user may raise their hand to point while speaking the command and lower their hand immediately after. In some examples, the GDIS may be triggered at the same time that the VAS is initially triggered, for example, when a wake word is identified by the VAS. This mode allows the user to be less synchronized between their speech and gesture. If a demonstrative pronoun is not identified, the VAS may ignore the GDIS output. If a meaningful gesture was not identified, the GDIS may return a null value. In some examples, gesture detection may be turned on for continuous detection. This may occur, for example, if a user is wearing augmented reality (AR) glasses, or any other suitable extended reality device that performs continuous gesture detection for all the applications that the user may be interacting with. In this example, the AR glasses' GDIS system may use the time range marked by the beginning and ending timestamp of a voice command to temporally correlate a pointing gesture within that period with the command. Detection of a gesture may comprise two key pieces of information: the user's location in reference to a known location, and the direction in 3D space in which the user is pointing. In some embodiments, the user gesture may be a head movement or an eye gaze to point to the device. A user's location may comprise the location of the user's pointing hand, limb, head and/or gaze.

In some examples, the gesture may be temporally correlated with lexical stress in a user's speech. The duration, energy and/or fundamental frequency associated with syllables, words and/or sequences of words of a command may be used to determine user emphasis. The VAS may trigger the GDIS on detecting lexical stress, or when GDIS is already on (if, for example, the GDIS is continuously running, or is triggered concurrently with VAS). A lexical stress timestamp range received from the VAS may be used to determine a time window (for example, 250 milliseconds before and after a sequence of words with lexical stress is identified) for identifying the gesture. For example, a user may stress the word "that" in the phrase "Turn that on," and the gesture may be identified in a window that occurs before and after the word "that." In this manner, the system may train a user to emphasize words when they are gesturing.

From step 412, the process concurrently proceeds to the HAS 406 where, at 422, a user intent is received, including a desired action and type of target device (if uttered), from the VAS 402 along with a VAS device location and/or history. The process proceeds to step 424, where a candidate device list is determined based on the VAS device location and/or grouping, desired action and type of target device (if uttered).

The VAS may transmit more information about the command to the HAS so that it can determine a list of candidate devices to which the command may apply. This additional information may include the VAS device on which the command was received, the action to be performed, and if available, the device type.

When multiple VAS devices are present, a VAS can resolve conflict based on where it receives the command in the best quality. For example, several sources of spoken input in multi-device environments may be ranked in order to give preference to the input with the highest estimated quality. The voice signals received by the multiple devices may be assessed in terms of their calculated acoustic quality and the reliability of the speech recognition hypotheses produced. After this assessment, each input may be assigned a unique score that allows the audio sources to be ranked so as to pick the best to be processed by the system. Determining the best VAS device that received the command offers a coarse localization, filtering the list of candidate devices on which the action may be performed to those that belong in the same group and/or zone as the VAS device receiving the voice command.

The action to be performed, which is inferenced by, for example, a natural language processor can indicate one or more device types as potential candidates for performing the action. In some examples, a device type may be explicitly mentioned by a user. This can help further reduce the candidate list, and in the best case it can determine a unique device. For example, if a user says "Alexa, dim that light to 20%," then the VAS may extract the action as "dim" and the device type as "light." Using an intersection set of all lights in the localized room, zone and/or group space associated with the VAS device and the lights that can be dimmed, the HAS can filter out the relevant devices that belong on the candidate list. In some examples, a user may not mention the device type, for example, "Alexa, turn that off." In this case, the HAS can identify all device types on which an action to "turn off" can be performed. The device type may be ambiguous, for example a light or a smart plug controlling a coffee machine. In some embodiments, the HAS may receive information from other sources, to further filter the candidate device list. The other sources may include, for example, historical user behavioral information, such as devices typically actuated at the present time of day, or weather information, such as whether it is sunny or cloudy and/or light conditions.

From steps 420 and 424, the process proceeds to the SAS 408 where, at 426, a candidate device list is received from the HAS 406 and gesture parameters are received from the GDIS 404 along with a known location. The process proceeds to step 428, where a device is identified to minimize the angle subtended between the device location and the pointing vector at the user (e.g., from a user's hand, head and/or eye) location subject to, for example, hyperparameter constraints. The process proceeds to step 430, where a candidate device is communicated to the HAS 406. The process proceeds to the HAS 406 where, at 432, actuation is performed on the identified device. The process then proceeds to the VAS 402 where, at 434, confirmation of the chosen device and action performed via the HAS 406 is received and is output to the user.

After the VAS triggers the GDIS to identify the gesture with parameters, and provides the HAS with the information to generate a candidate device list, both pieces of information may be passed to the SAS from the GDIS and HAS respectively. The SAS takes this information and may generate a unique most likely candidate device on which the actuation should be performed. The SAS may communicate this candidate device to the HAS, that performs the actuation, and may subsequently send a confirmation of the action performed with the result (for example, success or failure) along with the name of the candidate device to the VAS. The VAS may output this information back to the user.

In some examples, the HAS may generate a single candidate device if the information passed by the VAS is enough to narrow the candidate to a unique actuator. This may occur when the actuator deployment is sparse such that there are no confounding devices in the user space given an action and device type. For example, if there is only one actuator that turns on or off in the room, zone and/or group in which the VAS device receiving the command lies, and the command is to turn on or turn off, then there is no device ambiguity. In such cases, the SAS may act as a passthrough module that does not need to perform further processing.

Figure 5:
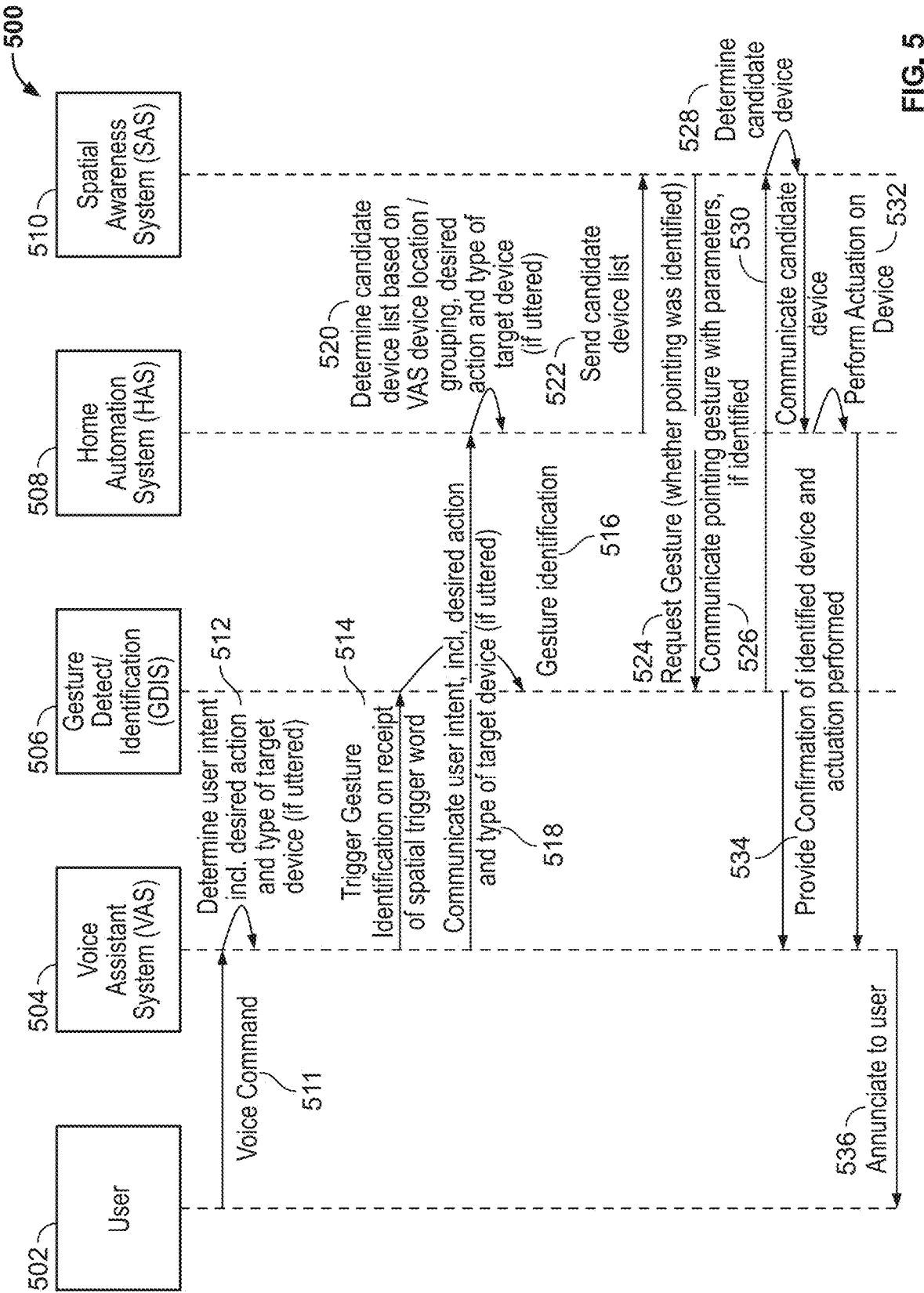
FIG. 5 shows another flowchart of illustrative steps involved in enabling improved voice and gesture control of a computing device, in accordance with some embodiments of the disclosure.

FIG. 5 shows another flowchart of illustrative steps involved in enabling improved voice and gesture control of a computing device, in accordance with some embodiments of the disclosure. Process 500 may be implemented, in whole or in part, on any of the aforementioned computing devices (e.g., computing devices 108, 208, 308; e.g., by way of executing one or more instructions or routines stored in the memory or storage of a device). In addition, one or more actions of the process 500 may be incorporated into or combined with one or more actions of any other process or embodiments described herein.

The flowchart broadly describes the interactions between a user 502, a voice assistance system (VAS) 504, a gesture detection and identification system (GDIS) 506, a home automation system (HAS) 508 and a spatial awareness system (SAS) 510. A voice command 511 is received at the VAS 504, from the user 502. The VAS determines 512 user intent including a desired action and a type of target device (if included in the voice command 511). On identifying receipt of a spatial trigger word, the VAS 504 transmits 514 an instruction to the GDIS 506 to perform gesture identification 516. Concurrently, the VAS 504 transmits 518 the user intent, including a desired action and type of target device (if included in the voice command 511) to the HAS 508. The HAS 508 determines 520 a candidate device list based on VAS 504 service location and/or grouping, desired action and a type of target device (if included in the voice command 511). A candidate device list is transmitted 522 to the SAS 510, and the SAS 510 requests 524 a gesture identification from the GDIS 506. The GDIS transmits 526 the identified gesture and any parameters to the SAS 510. At the SAS 510, a candidate device is determined 528. The candidate device is transmitted 530 to the HAS 508. At the HAS 508, actuation is performed 532 on the identified device, and confirmation of the identified device and actuated command is transmitted 534 to the VAS 504. At the VAS 504, the confirmation is output 536 to the user.

The GDIS may use a combination of technologies to identify the gesture and estimate parameters, for example, the location of, for example, a pointing hand (with, for example, x, y, z being the location of the pointing hand when the sensor is at a known reference location 0, 0, 0) and the pointing direction (for example, a unit vector with x, y, z components or corresponding polar representation 1, $\varphi$, $\theta$). A capture device, optionally embedded in a computing device such as smart speakers 108, 208, 308 described above, such as an image sensor and/or a depth sensor, may be deployed to determine the gesture and its parameters. Many VAS devices today are equipped with cameras. Computer vision may be utilized to analyze the output of such a capture device, such as a camera, in order to be able to identify the direction of a pointing gesture made by a user using, for example, skeletal tracking, i.e., identifying a user's 3D geometry.

Another method to estimate the gesture parameters is to use a depth, LiDAR and/or time-of-flight (ToF) sensor to dynamically recreate a 3D model of the hand and determine its distance and pointing direction. Again, any of these sensors may be integrated in a computing device such as smart speakers 108, 208, 308 described above and/or any VAS device. A precise user hand location and pointing direction may be obtained from depth sensors that may be placed at a known location, or locations. In some cases, pointing direction is determined using a combination of cues such as by drawing a line in space between the person's eyes and hand. Body features may be extracted from depth and amplitude images of a ToF camera, and a model may be trained to determine pointing directions using, for example, Gaussian process regression. Such a method may be used to determine the pointing direction of a user.

When a user moves their hand naturally, they may bring their hand to rest at the point when the gesture is made. This determination may be made by the GDIS by comparing consecutive camera or depth images. The gesture parameter estimates may be made when the rate of change across images, or frames, (for example, by comparing pixel values) is low, i.e., when it is below a threshold. Absolute values of differences or squares of differences of pixel values across consecutive frames may be used to determine the point where the user stabilizes their pointing gesture. For example, consider two consecutive frames $f_n$ and $f_{n+1}$ captured by a depth camera where the pixel values at x and y are described by $d$ (x, y, $f_n$) and d(x, y, $f_{n+1}$), respectively. Then the cumulative difference between the frames fn and fn+1 may be calculated using:

$$\sum_{y=0}^{Y}\sum_{x=0}^{X}\{d(x, y, f_{n+1}) - (d(x, y, f_n)\}^2$$

At the point of gesture stabilization, this value reduces significantly.

The time for which the user holds the gesture may also be used for determining the frame(s) that are used for parameter estimation. For example, if the user holds a gesture for a second, then at a 30 frame per second capture rate, about 30 frames shall have an image that resolves to the same hand location and pointing direction. In this example, 30 is a threshold number of frames for which the estimated parameters have a difference that is within system-defined error. By searching for the frames within the VAS command begin and end timestamps where the cumulative difference between pixel values across consecutive frames is minimized and held stable for a certain number of frames, the system narrows down the images, or frames, that are input for gesture parameter estimation.

In some examples, a user location and finger pointing direction may be derived from another system, such as an AR glass (or any other extended reality device) with a handheld controller, or by using hand gesture estimation. Again, by using a combination of image and depth sensors, the location of a user's hand and the pointing direction may be determined. While "outside-in" tracking in a mixed reality system is similar to the method already described where the parameters are estimated in relation to another image, or depth, sensor at a reference location, an AR system may use "inside-out" tracking, i.e., the sensors are not stationary, but rather they lie on a moving AR system device, or devices. In some examples, inertial sensors such as accelerometers and/or gyroscopes in an inertial measurement unit (IMU) may be used to track a user location, hand location and/or pointing direction using wearable devices such as a smart watch and/or a smart ring.

In some examples, a gesture to point to a target device may be a head movement and/or an eye gaze. In such a system, the gesture parameters may be derived from AR glasses (or any other extended reality device). Eye gaze is typically determined from infrared sensors (measuring reflection of an infrared LED from the eye pupil and/or cornea) on AR glasses while head movement is measured by an IMU equipped with accelerometers and/or gyroscopes.

When an external image or depth sensor is used to determine the gesture parameters, the sensor may be placed at a known location, which is available to the SAS module. Any computing device equipped with an image or depth sensor may be operatively coupled with the VAS to determine a parameterized user gesture; however, when an AR system (or any suitable extended reality system) is coupled with the VAS for gesture detection, a user's current location (a dynamic value) becomes the known location. This may be realized via the simultaneous localization and mapping (SLAM) capabilities of an AR system (or any suitable extended reality system). In some embodiments, more than one image and/or depth sensor may be activated by the GDIS to determine the parameterized gesture. In such cases, sensor data fusion techniques may be used to improve the gesture detection and parameterization.

The SAS may develop a spatial understanding of the user space by receiving a map with the locations of the various VAS and HAS devices. In some examples, this map may be developed out of band using a floor plan and manually marking each of the device locations on this map, for example by a user. In this example, the spatial awareness may be developed in 2D rather than 3D. The SAS may then flatten subsequent geometric algorithms to run in 2D space instead of 3D space (for example, a 3D cone becomes a sector of a circle). In some embodiments, the map may be derived from a robotic device such as a vacuum cleaner, a robot assistant, and/or a lawn mower that is SLAM capable. Such mapping may use a camera or LiDAR-based underlying technology.

In some examples, the map of user space may be developed via SLAM using an AR glass wearable, or any suitable extended reality device. The space may be mapped during the normal course of AR glasses usage. By performing segmentation, or object detection, on images and subsequently allowing the user to tag objects, the location of various HAS and VAS devices may be stored in a persistent 3D map. Once overlaid on the mapping data, a 3D spatial map with locations of HAS and/or VAS devices is obtained by the SAS. In some examples, a smartphone, tablet and/or other suitable user device may be used to develop a 3D map of the user space using SLAM from vision and/or depth sensing capabilities. For example, Apple released the Room-Plan API to perform this task.

Is some cases, 3D object detection is useful in tagging a home automation component (for example, a lamp shade of a floor lamp can be tagged as the floor lamp); however, this may not always be useful. For example, consider a door lock (deadbolt), which may not be detected as an object separate from the door. In such a case, the user must follow an iterative process of spatially anchoring the object in the 3D space. The user begins by anchoring the shape or point depicting the device at (x, y) coordinates in their view using their AR, or any other suitable extended reality, interface. Initially the system chooses an arbitrary depth z while spatially anchoring the point, or shape. The user may then move to a proximate location and iterate the placement of the point or shape. In the best case, the user places themselves perpendicular to the initial view so they may adjust z from an arbitrary depth to the correct value. This enables the user to correctly mark (x, y, z) the point, or shape, in a single iteration. Otherwise, the user rotates their view until they iteratively converge the z depth to a value. If the chosen point (x, y, z) lies on a detected object or plane, then the system makes an association between the shape and the detected object. For example, <Door Lock> may be added and tagged in the user space, and may lie on the <Door>, a detected object in the user space. This enables the system to tether the HAS device to the 3D object or plane, so that the HAS device is moved synchronously as the 3D object or plane is moved.

After developing spatial awareness offline, when the user issues a combined voice and gesture command, the SAS may receive a message from the GDIS specifying geometric parameters of the pointing gesture and another message from the HAS with a candidate device list for actuation. Using geometric techniques, the SAS may project a pointing direction vector from the user location and attempt to find a unique device that is most likely to be the device represented by this pointing vector. The pointing direction vector may typically be a vector from the user's eye to the user's wrist/hand. The SAS may then calculate the following two parameters for each device on the candidate device list received from the HAS: distance of the device from the pointing direction vector in a normal direction, and distance of the device from the user location in a direction parallel to the pointing direction. In polar coordinates this may be represented by $(d_i, \theta_i)$ for device i.

If the angle subtended by a candidate device from the pointing direction at the user location is $\theta$, and the distance between the candidate device and user location is d, then the former is given by d sin $\theta$, and the latter by d cos $\theta$. In some examples, the system may choose the device that subtends the least angle from the pointing direction, i.e., minimizes $\theta$. In other embodiments, the system minimizes $\theta$, subject to a maximum distance from the user location D. In this example, the system may find a device i represented by $(d_i, \theta_i)$ measured from a user location: find device i, minimize $\theta_i$, subject to $d_i \leq D$.

Figure 6:
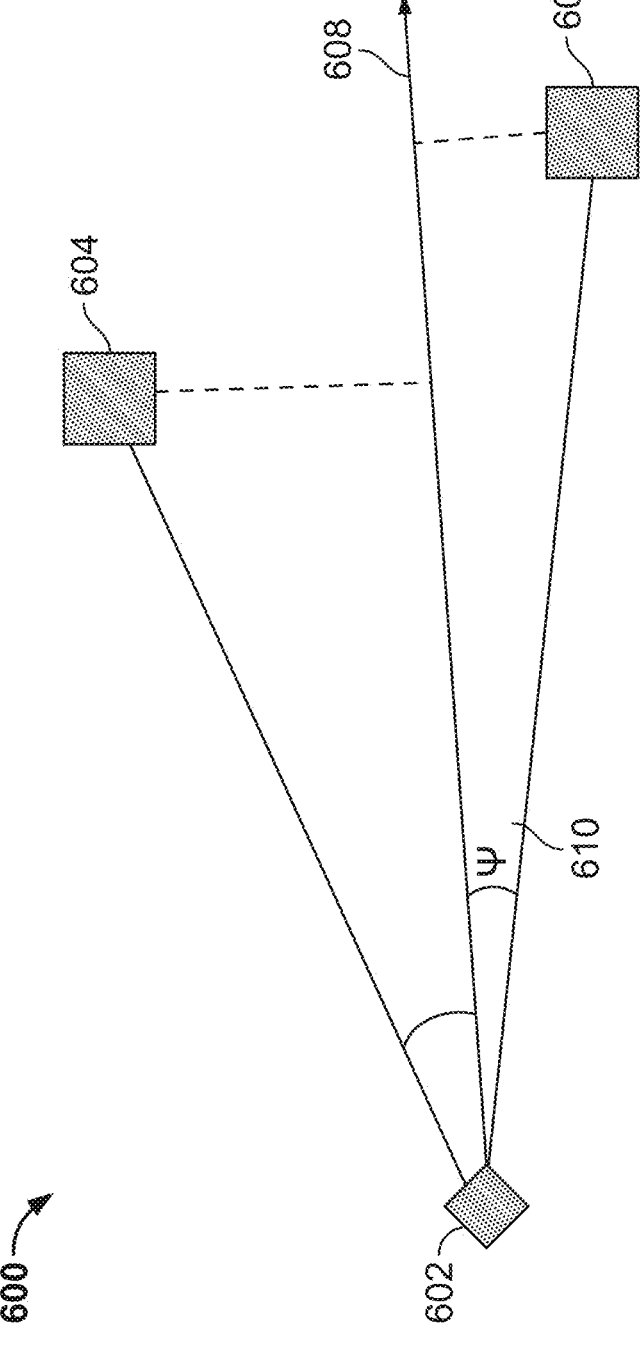
FIG. 6 shows a schematic direction vector, in accordance with some embodiments of the disclosure.

FIG. 6 shows a schematic direction vector, in accordance with some embodiments of the disclosure. The environment 600 comprises a user 602, a first smart device 604 and a second smart device 606. The direction vector 608 may be utilized in choosing a target device between the first smart device 604 and the second smart device 606 in a home automation system. The system may choose the second smart device 606 over the first smart device 604 as it subtends a smaller angle ψ 610 from the direction vector 608 at the user's 602 location. However, if the second smart device 606 lies at a distance greater than a threshold distance hyperparameter, then the system may choose the first device 604 over the second device 606.

In some examples, an AR device (or any other suitable extended reality device) and system software may act as the GDIS by determining a gesture and its parameters. In some examples, an AR device (or any other suitable extended reality device) and system software may also act as the SAS, having developed a persistent map of the user space with tagged locations of the HAS devices. Thus, an AR system (or any other suitable extended reality system) may combine the gesture detection and spatial awareness functions into one module. The HAS and VAS may also be combined into an integrated system. Thus, it is possible that an AR system (or other suitable extended reality system) may directly interact with the HAS, receiving a candidate device list from the HAS and using its spatial awareness together with gesture detection to communicate the target device back to the HAS. The HAS may perform the action and provide annunciation to the user.

Figure 7:
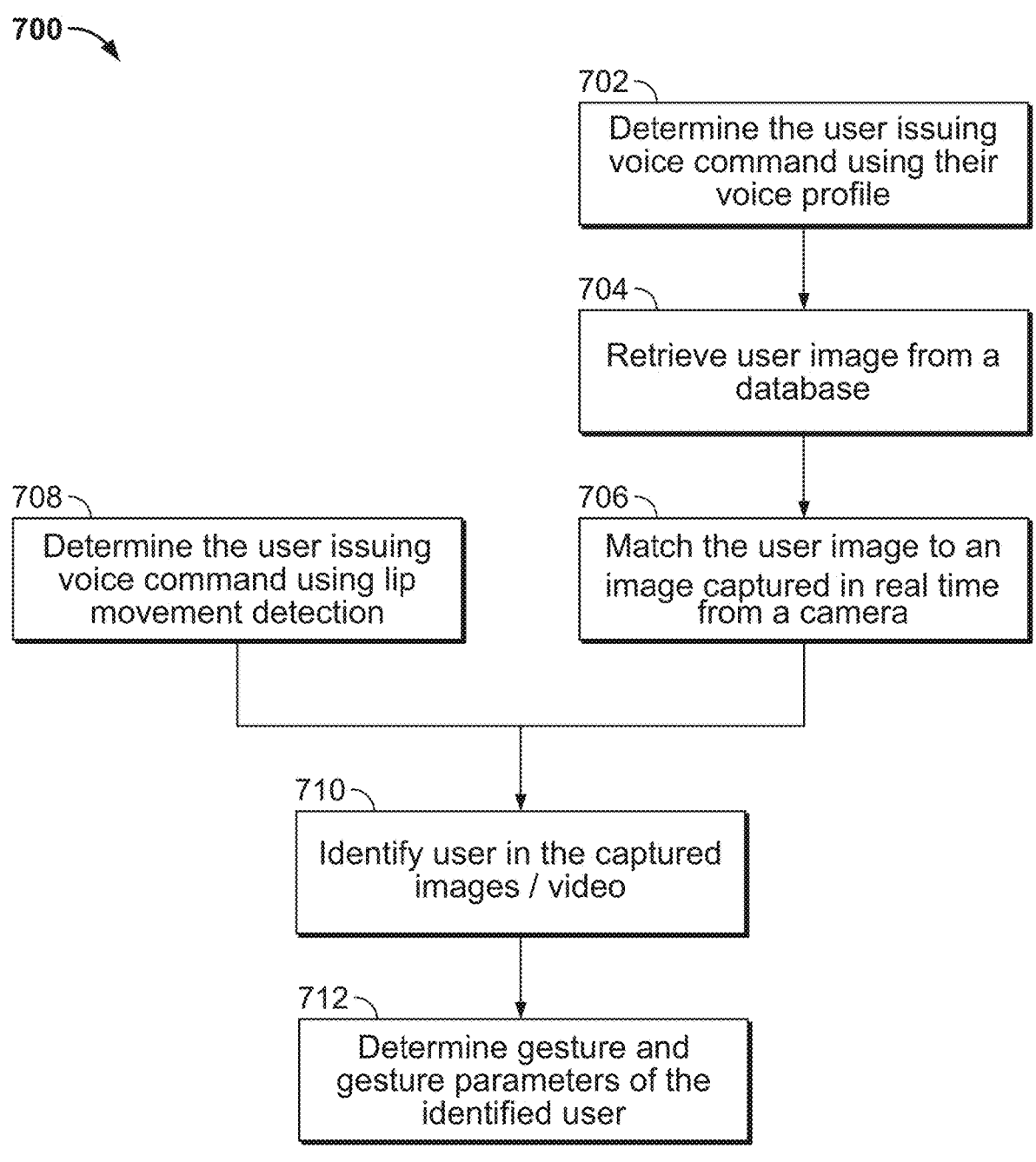
FIG. 7 shows another flowchart of illustrative steps involved in enabling improved voice and gesture control of a computing device, in accordance with some embodiments of the disclosure.

FIG. 7 shows another flowchart of illustrative steps involved in enabling improved voice and gesture control of a computing device, in accordance with some embodiments of the disclosure. Process 700 may be implemented, in whole or in part, on any of the aforementioned computing devices (e.g., computing devices 108, 208, 308; e.g., by way of executing one or more instructions or routines stored in the memory or storage of a device). In addition, one or more actions of the process 700 may be incorporated into or combined with one or more actions of any other process or embodiments described herein.

The following steps may be used to identify a user in a group of users. At 702, a user issuing a voice command is determined using their voice profile. At 704, an image of the user is retrieved from a database, for example, a database associated with a user profile. At 706, the user image is matched to an image captured in real time, or substantially in real time, from a camera. In another example, at 708, a user issuing a command may be determined using lip movement detection. Step 708 may occur concurrently with any of steps 702-706, or may occur instead of steps 702-706. In another example, steps 702-706 may occur without step 708. The process proceeds from steps 706 and/or 708 to step 710, where the user is identified in the captured images and/or video. At 712, a gesture and gesture parameters of the identified user are determined.

In some examples, more than one person may be present in the field of view of a capture device, such as an image or depth camera, operatively coupled to a VAS device, such as the smart speaker 108, 208, 308 described above. In such examples, the VAS device may identify the person who issued the voice command via a voice profile. A user's voice profile may be stored locally at a VAS device, or remotely at server accessible via, for example, the internet. In some examples, a user's voice profile may also be associated with their image. Once the VAS identifies the user, the system GDIS may identify the person in the captured image using facial recognition, body ratio measurement, or a similar technique that can be applied to an RGB, or depth image. Subsequently, the GDIS may determine the gesture and parameters associated with this person such as pointing hand, eye gaze and/or head movement. In some examples, the GDIS may determine the user that is issuing the voice command by detecting lip movement of one of the persons present in the images obtained from successive video frames.

In some examples, a user and a VAS device, such as smart speaker 108, 208, 308, may have a follow-on conversation after the initial voice command is issued. The follow-on conversation may also contain user gestures that would need to be identified. In a first example, a user may point to a device and issue the voice command "Adjust volume of that device." The smart speaker may respond "I believe you would like to adjust the volume of the Media Room TV. The current volume level is 7 on a scale of 1 to 10. What volume would you like?" The user may respond by holding up three fingers, to indicate that they would like a volume level of 3. In a second example, a user may point in the vicinity of a device and issue the voice command "Turn that on." The smart speaker may respond, "That could be your media room TV or media room window blind. Based on your command at around the same time yesterday, I think you mean the Media Room TV. Is that correct?" The user may respond with a thumbs-up gesture, indicating that the system inference was correct. In some examples, multiple people may be detected by a camera coupled to a VAS device, such as a smart speaker 108, 208, 308 mentioned above. In this example, the system may continue to interpret follow-on gestures of the user who was originally identified as the issuer of the voice command, even when multiple persons are detected. In some examples, the coupled camera may be commanded to zoom into or track a user using a pan-tilt-zoom camera (PTZ), or an electronic-PTZ camera, so that their follow-on gestures are captured in higher fidelity.

Figure 8:
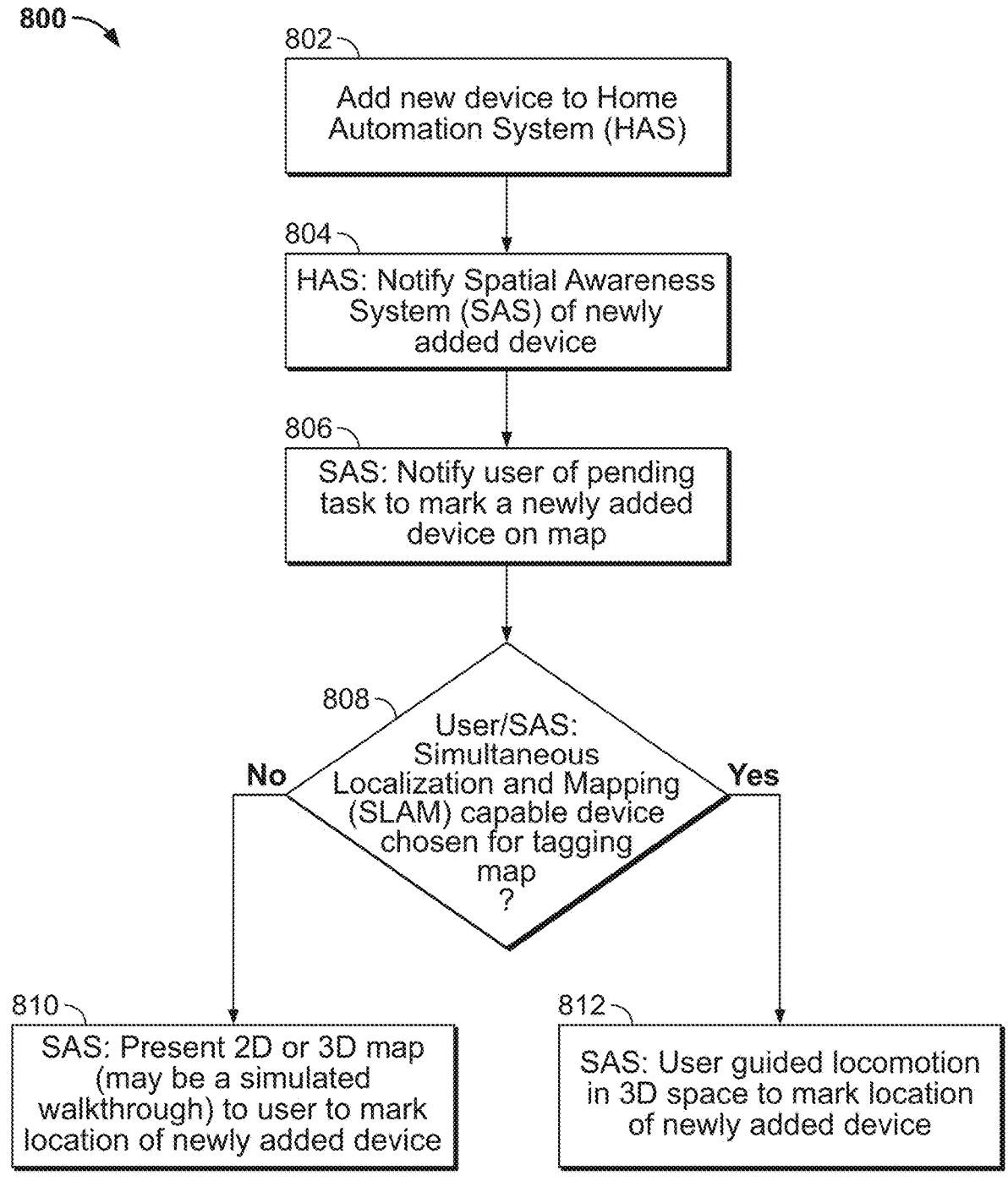
FIG. 8 shows another flowchart of illustrative steps involved in enabling improved voice and gesture control of a computing device, in accordance with some embodiments of the disclosure.

FIG. 8 shows another flowchart of illustrative steps involved in enabling improved voice and gesture control of a computing device, in accordance with some embodiments of the disclosure. Process 800 may be implemented, in whole or in part, on any of the aforementioned computing devices (e.g., computing devices 108, 208, 308; e.g., by way of executing one or more instructions or routines stored in the memory or storage of a device). In addition, one or more actions of the process 800 may be incorporated into or combined with one or more actions of any other process or embodiments described herein.

At 802, a new device is added to the home automation system (HAS). At 804, the HAS notifies the spatial aware-ness system (SAS) that a new device has been added via the HAS. At 806, a user is notified of a pending task to mark the newly added device on a map. This may take place via, for example, a smartphone associated with a user via a user profile, and a notification may be generated for display at the smartphone. At 808, it is determined whether the device that has been chosen for tagging is a simultaneous localization and mapping (SLAM)-capable device. This may be deter-mined via, for example, user input indicating that the device is a SLAM-capable device, e.g., by a spoken command received via the HAS. In another example, the SLAM-capable device may report its capabilities directly to the HAS. If the device is not a SLAM-capable device, then, at 810, the SAS presents a 2D, or 3D, map to a user to mark the location of the newly added device. For example, a smartphone may generate a virtual map of the room that the user is in for display. The user may provide user input via, for example, a touchscreen of the smartphone to indicate on the map where the device has been placed in the room. If the device is a SLAM-capable device, then, at 812, the SAS guides a user to mark a location of the newly added device in a 3D representation of the room.

The SAS may be a system that creates a map of the user environment. The map may be derived from a device that autonomously locomotes such as robot vacuum cleaner and/or a pet assistant, or it may be user driven by data from a device such as a smartphone and/or AR glasses. The association between an HAS account and an SAS account may be achieved using an authorization protocol such as OAuth 2.0. The SAS may also have mechanisms and pro-visions for a user to mark HAS devices on a map. AN HAS account connected to a VAS account, for example, using an authorization protocol like OAuth 2.0, may provide a noti-fication to the VAS account when a new device is installed, or added to (or removed, or deleted, from) the HAS. The HAS may also provide a notification to the SAS when a new device is added.

When the SAS receives the notification, it may signal to a user device that a user should tag a new HAS device in 3D space. This pending task may be output, for example, displayed, to the user. The user may accept the pending task via a user interface element associated with the notification and, in one example, the user interface of the SAS may display the user space map and prompt the user to mark the location of the newly added device. In another example, a registered computing device used for mapping that is capable of SLAM and marking object locations may receive the notification. At a suitable time, the SLAM-capable device may prompt the user to locomote to the newly added device location in the 3D user space and mark the added device.

An advantage of being able to gesture to indicate devices is that it alleviates the need to remember names of smart devices, such as home security, media and automation devices. In some examples, a user may point to a device whose name they do not recall, allowing them to retrieve information or perform an action. For example, a user may point to a door lock and ask, "Hey Assistant, is that locked?" or may ask a device to perform an action, such as, "Hey Assistant, lock that now." This replaces the need to issue a specific command directed to the named door lock, such as "Hey Assistant, is lock 2 on meeting room 3a door locked?" or "Hey Assistant, lock meeting room 3a door lock 2." In another example, a user may not remember the name of a camera whose video feed they want to request, but the user can point in the direction of that camera and say, "Hey Assistant, show me live video from that camera." Pointing also enables the disambiguation of multiple devices of a certain type in an environment into a single instance. This can help the user, for example, perform an action on one of several lights in a room, or one of multiple blinds in a room. In another example, a user may request that their playlist be played on one of several speakers in a room. In a further example, the user may point in the direction of one of several irrigation zones and request them to be watered.

FIG. 9 shows a block diagram representing components of a computing system, and dataflow therebetween for enabling improved voice and gesture control of a computing device, in accordance with some embodiments of the dis-closure. Each component, or module, of the system may be implemented on one or more computing devices. Computing system 900 comprises input circuitry 904, control circuitry 908 and output circuitry 930. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate pro-cessors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

In an example system, the computing system 900 may comprise a plurality of computing devices for implementing a VAS, a GDIS, an HAS and an SAS, as described herein. The VAS, which may comprise one or more computing devices and/or a remote server, such as a cloud sever, may perform voice command intent inference. The GDIS, which may comprise one or more computing devices with imaging capabilities and/or a remote server, such as a cloud sever, may perform gesture identification. The HAS, which may comprise one or more computing devices implementing a home hub and/or a remote server, such as a cloud sever, may detect target candidates. The SAS, which may comprise one or more extended reality computing devices, such as augmented reality glasses, and/or a remote server for performing additional processing, such as a cloud sever, may make the final determination of a target device.

Input is received 902 by the input circuitry 904. The input circuitry 902 is configured to receive inputs related to a computing device. For example, this may be via a microphone, a camera, a touchscreen, a Bluetooth and/or Wi-Fi controller of the computing system 900, an infrared controller, a keyboard, and/or a mouse. In other examples, this may be via gesture detected via an extended reality device. In another example, the input may comprise instructions received via another computing device. The input circuitry 904 transmits 906 the user input to the control circuitry 908.

The control circuitry 908 comprises a target device filter module 909, a voice command receiving module 912, a gesture identification module 914, a location identification module 918, a direction vector identification module 922, a target computing device identification module 926 and an output module 930 comprising a command transmission module 932. Each of the components 904, 909, 912, 914, 918, 922, 926, 930, 932 of the computing system 900 may be implemented on the same and/or separate computing devices.

The input is transmitted 906, to the target device filter module 909. At the target device filter module, target device candidates are identified based on the received input, such as a command, and are subsequently filtered based on, for example, received attributes and commands. In some examples, an HAS may reduce the target device candidates based on attributes and commands received from a VAS. An indication of the target device candidates is concurrently transmitted 910 to the voice command receiving module 912 and the gesture identification module 914. At the voice command receiving module, the voice command is received and interpreted, and at the gesture identification module 914, a user gesture is identified. An indication of the command and gesture is transmitted 916 to the location identification module 918, where the location of the user performing the gesture in an area proximate to the user is identified. An indication of the command, gesture and location is transmitted 920 to the direction vector identification module 922, where a direction vector is identified based on the gesture. An indication of the command, location and direction vector is transmitted 924 to the target computing device identification module 926, where a target computing device is identified. For example, a target computing device is identified to minimize the angle subtended between the device location and the direction vector. An indication of the command and the target computing device is transmitted 928 to the output module 930, where a command is transmitted to the target computing device by the command transmission module 932.

FIG. 10 shows another flowchart of illustrative steps involved in enabling improved voice and gesture control of a computing device, in accordance with some embodiments of the disclosure. Process 1000 may be implemented, in whole or in part, on any of the aforementioned computing devices (e.g., computing devices 108, 208, 308; e.g., by way of executing one or more instructions or routines stored in the memory or storage of a device). In addition, one or more actions of the process 1000 may be incorporated into or combined with one or more actions of any other process or embodiments described herein.

At 1002, a voice command is received from a user and, at 1003, target device candidates for the command are identified and subsequently filtered based on, for example, received attributes and commands. In some examples, an HAS may reduce the target device candidates based on attributes and commands received from a VAS. At 1004, a gesture being performed by a user is identified. At 1006, a location of the user performing the gesture is identified in an area proximate to the user, and, at 1008, a direction vector is identified based on the gesture. At 1010, a target computing device is identified, for example, by minimizing the angle subtended between the device location and the direction vector. At 1012, the command is transmitted to the target computing device.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, at a first computing device, a voice command from a user;

identifying, at the first computing device, a gesture being performed by the user concurrently with receiving the voice command;

identifying, at the first computing device, a location of the user performing the gesture in an area proximate to the user, wherein the location of the user is identified relative to the first computing device;

identifying, based on, at least in part, the gesture, a direction vector extending from the user;

identifying, at the first computing device and based on, at least in part, the location of the user relative to the first computing device and the direction vector, a target second computing device and a target third computing device in the area proximate to the user from a plurality of computing devices, wherein the first computing device, the target second computing device and the target third computing device are different; p1 determining that the target second computing device and the target third computing device are within a threshold distance from the user;

determining a first angle subtended by the target second computing device and the direction vector;

determining a second angle subtended by the target third computing device and the direction vector;

identifying that the first angle is less than the second angle; and selecting the target second computing device based on, at least in part, the target second computing device being within the threshold distance from the user and the first angle being less than the second angle;

transmitting, from the first computing device to the target second computing device, a command, wherein the command is based on, at least in part, the received voice command.

2. The method of claim 1, wherein:

the method further comprises determining, at the first computing device and based on, at least in part, the received voice command and the gesture, a plurality of candidate computing devices; and identifying the target second computing device from the plurality of computing devices further comprises identifying the target second computing device from the plurality of candidate computing devices.

3. The method of claim 2, wherein:

the method further comprises accessing, at the first computing device, a spatial map indicating locations of each of the plurality of candidate computing devices; and identifying the location of the user performing the gesture further comprises identifying the location of the user on the spatial map relative to at least a subset of the locations of each of the plurality of candidate computing devices.

4. The method of claim 3, wherein the candidate computing devices are members of a group and the method further comprises:

adding, at the first computing device, an additional candidate computing device to the group;

generating, at the first computing device and based on, at least in part, the additional candidate computing device being added to the group, a request to update the spatial map;

receiving, at the first computing device, a location of the additional candidate computing device; and updating, at the first computing device, the spatial map with the location of the additional candidate computing device.

5. The method of claim 1, wherein:

the method further comprises:

identifying, at the first computing device and based on, at least in part, a captured image, a plurality of users local to the first computing device; and identifying, at the first computing device and via image processing, the user from whom the voice command was received; and identifying the gesture further comprises identifying the gesture being performed by the identified user from whom the voice command was received.

6. The method of claim 5, wherein:

the method further comprises:

identifying, at the first computing device and via speech recognition and a user profile, a user associated with the voice command; and accessing, at the first computing device and via the user profile, an image associated with the user; and identifying, at the first computing device, the user from whom the voice command was received further comprises identifying the user via image processing based on, at least in part, the accessed image associated with the user.

7. The method of claim 1, wherein:

the method further comprises:

identifying, at the first computing device and based on, at least in part, a captured video, a plurality of users local to the first computing device;

identifying, at the first computing device and via video processing, lip movements of the plurality of users; and identifying, at the first computing device and based on, at least in part, the lip movements of the plurality of users, the user from whom the voice command was received; and identifying the gesture further comprises identifying the gesture being performed by the identified user from whom the voice command was received.

8. The method of claim 1, wherein:

the gesture is a first gesture; and the method further comprises:

receiving, from a capture device, a capture of a plurality of users local to the first computing device;

identifying, based on, at least in part, the capture, the user from whom the voice command was received;

transmitting a plurality of commands to the capture device, wherein the plurality of commands comprises commands to move the capture device to keep the user from whom the command was received in the received capture;

outputting a query; and identifying, via the capture, a response to the query comprising a second gesture being performed by the user.

9. The method of claim 2, wherein:

the method further comprises:

identifying, at the first computing device, a group of computing devices associated with the first computing device that receives the voice command;

identifying, at the first computing device and based on, at least in part, the command, a type of computing device; and accessing, at the first computing device and to identify a command history, a user profile; and identifying the plurality of candidate computing devices further comprises filtering the initial plurality of identified candidate computing devices based on at least one of:

the group of computing devices associated with the first computing device that receives the voice command;

the identified type of computing device;

the computing devices capable of performing the command; and the identified command history.

10. The method of claim 1, wherein identifying the direction vector extending from the user further comprises identifying the direction vector based on at least one of: a direction of a user's finger, a direction of a user's hand, a direction of a user's head movement and/or a direction of a user's gaze.

11. A system comprising:

input/output circuitry configured to:

receive, at a first computing device, a voice command from a user;

processing circuitry configured to:

identify, at the first computing device, a gesture being performed by the user concurrently with receiving the voice command;

identify, at the first computing device, a location of the user performing the gesture in an area proximate to the user, wherein the location of the user is identified relative to the first computing device;

identify, based on, at least in part, the gesture, a direction vector extending from the user;

identify, at the first computing device and based on, at least in part, the location of the user relative to the first computing device and the direction vector, a target second computing device and a target third computing device in the area proximate to the user from a plurality of computing devices, wherein the first computing device, the target second computing device and the target third computing device are different;

determine that the target second computing device and the target third computing device are within a threshold distance from the user;

determine a first angle subtended by the target second computing device and the direction vector;

determine a second angle subtended by the target third computing device and the direction vector;

identify that the first angle is less than the second angle; and select the target second computing device based on, at least in part, the target second computing device being within the threshold distance from the user and the first angle being less than the second angle;

transmit, from the first computing device to the target second computing device, a command, wherein the command is based on, at least in part, the received voice command.

12. The system of claim 11, wherein:

the processing circuitry is further configured to determine, at the first computing device and based on, at least in part, the received voice command and the gesture, a plurality of candidate computing devices; and the processing circuitry configured to identify the target second computing device from the plurality of computing devices is further configured to identify the target second computing device from the plurality of candidate computing devices.

13. The system of claim 12, wherein:

the processing circuitry is further configured to access, at the first computing device, a spatial map indicating locations of each of the plurality of candidate computing devices; and the processing circuitry configured to identify the location of the user performing the gesture is further configured to identify the location of the user on the spatial map relative to at least a subset of the locations of each of the plurality of candidate computing devices.

14. The system of claim 13, wherein the candidate computing devices are members of a group and the processing circuitry is further configured to:

add, at the first computing device, an additional candidate computing device to the group; generate, at the first computing device and based on, at least in part, the additional candidate computing device being added to the group, a request to update the spatial map;

receive, at the first computing device, a location of the additional candidate computing device; and update, at the first computing device, the spatial map with the location of the additional candidate computing device.

15. The system of claim 11, wherein:

the processing circuitry is further configured to:

identify, at the first computing device and based on, at least in part, a captured image, a plurality of users local to the first computing device; and identify, at the first computing device and via image processing, the user from whom the voice command was received; and the processing circuitry configured to identify the gesture is further configured to identify the gesture being performed by the identified user from whom the voice command was received.

16. The system of claim 15, wherein:

the processing circuitry is further configured to:

identify, at the first computing device and via speech recognition and a user profile, a user associated with the voice command; and access, at the first computing device and via the user profile, an image associated with the user; and the processing circuitry configured to identify, at the first computing device, the user from whom the voice command was received is further configured to identify the user via image processing based on, at least in part, the accessed image associated with the user.

17. The system of claim 11, wherein:

the processing circuitry is further configured to:

identify, at the first computing device based on, at least in part, a captured video, a plurality of users local to the first computing device;

identify, at the first computing device and via video processing, lip movements of the plurality of users; and identify, at the first computing device and based on, at least in part, the lip movements of the plurality of users, the user from whom the voice command was received; and the processing circuitry configured to identify the gesture is further configured to identify the gesture being performed by the identified user from whom the voice command was received.

18. The system of claim 11, wherein:

the gesture is a first gesture; and the processing circuitry is further configured to:

receive, from a capture device, a capture of a plurality of users local to the first computing device;

identify, based on, at least in part, the capture, the user from whom the voice command was received;

transmit a plurality of commands to the capture device, wherein the plurality of commands comprises commands to move the capture device to keep the user from whom the command was received in the received capture;

output a query; and identify, via the capture, a response to the query comprising a second gesture being performed by the user.

19. The system of claim 12, wherein:

the processing circuitry is further configured to:

identify, at the first computing device, a group of computing devices associated with the first computing device that receives the voice command;

identify, at the first computing device and based on, at least in part, the command, a type of computing device; and access, at the first computing device and to identify a command history, a user profile; and the processing circuitry configured to identify the plurality of candidate computing devices is further configured to filter the initial plurality of identified candidate computing devices based on at least one of:

the group of computing devices associated with the first computing device that receives the voice command;

the identified type of computing device;

the computing devices capable of performing the command; and the identified command history.

20. The system of claim 11, wherein the processing circuitry configured to identify the direction vector extending from the user further comprises processing circuitry configured to identify the direction vector based on at least one of: a direction of a user's finger, a direction of a user's hand, a direction of a user's head movement and/or a direction of a user's gaze.

\* \* \* \* \*